US012619267B2

(12) United States Patent
Kubotani et al.

(10) Patent No.: US 12,619,267 B2
(45) Date of Patent: May 5, 2026

(54) INDUSTRIAL VEHICLE

(71) Applicant: KABUSHIKI KAISHA TOYOTA JIDOSHOKKI, Aichi (JP)

(72) Inventors: Takehiro Kubotani, Aichi-ken (JP); Taku Mizuki, Aichi-ken (JP); Tomoya Igarashi, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 238 days.

(21) Appl. No.: 18/023,459

(22) PCT Filed: Aug. 17, 2021

(86) PCT No.: PCT/JP2021/029981
§ 371 (c)(1),
(2) Date: Feb. 27, 2023

(87) PCT Pub. No.: WO2022/050036
PCT Pub. Date: Mar. 10, 2022

(65) Prior Publication Data
US 2023/0229178 A1      Jul. 20, 2023

(30) Foreign Application Priority Data
Sep. 1, 2020    (JP) ................................. 2020-146950

(51) Int. Cl.
*G05D 13/06* (2006.01)
*G05D 13/66* (2006.01)
*G08G 1/16* (2006.01)

(52) U.S. Cl.
CPC ............... *G05D 13/66* (2013.01); *G08G 1/16* (2013.01)

(58) Field of Classification Search
CPC .................................. G05D 13/66; G08G 1/16
See application file for complete search history.

(56) References Cited

U.S. PATENT DOCUMENTS 8,731,786 B2    5/2014    Tueshaus
9,399,567 B2    7/2016    Koide et al.
(Continued)

FOREIGN PATENT DOCUMENTS

JP        2001031391 A      2/2001
JP        2015170284 A  *  9/2015  ........... G05D 1/0214
(Continued)

OTHER PUBLICATIONS

English Machine Translation of JP-2015170284-A (Year: 2014).*
(Continued)

*Primary Examiner* — Andrew J Cromer
(74) *Attorney, Agent, or Firm* — Sughrue Mion, PLLC

(57)    ABSTRACT

An industrial vehicle includes a driving device, a travel control device configured to control the driving device, an object detection unit, a first control unit setting a limit value, when a vehicle speed of the industrial vehicle is in a first vehicle speed range, a second control unit setting the limit value when the vehicle speed of the industrial vehicle is in a second vehicle speed range, and a speed limit unit imposing the speed limit according to the limit value. The first control unit includes a starting prohibition control unit that sets the limit value and a starting permission control unit that sets the limit value. The speed limit unit imposes the speed limit according to the limit value set by the first control unit when the limit value is set by the starting permission control unit.

4 Claims, 7 Drawing Sheets

(56)                    References Cited

U.S. PATENT DOCUMENTS

| 11,332,137 | B2 |  | 5/2022 | Cheyne et al. |  |
|---|---|---|---|---|---|
| 2011/0166721 | A1 |  | 7/2011 | Castaneda et al. |  |
| 2017/0274904 | A1 |  | 9/2017 | Koide et al. |  |
| 2018/0346029 | A1 | * | 12/2018 | Kabos | B62D 15/029 |
| 2020/0031335 | A1 |  | 1/2020 | Ohmura |  |
| 2020/0114909 | A1 | * | 4/2020 | Shelton | B60W 30/09 |
| 2022/0411246 | A1 | * | 12/2022 | Kubotani | B66F 17/003 |

FOREIGN PATENT DOCUMENTS

| JP | 2016-194481 | A | 11/2016 |
|---|---|---|---|
| JP | 2017172553 | A | 9/2017 |
| JP | 2018-181209 | A | 11/2018 |
| WO | 2018/187341 | A1 | 10/2018 |
| WO | 2021/111839 | A1 | 6/2021 |

OTHER PUBLICATIONS

Extended European Search Report issued Jan. 25, 2024 in European Application No. 21864094.4.
Australian Office Action dated Dec. 8, 2023 in Application No. 2021336178.
Communication dated Aug. 5, 2024 issued by the Canadian Patent Office in application No. 3190508.
Office communication dated Oct. 4, 2024 in Australian Application No. 2021336178.
Communication issued Mar. 15, 2025 in Chinese Application No. 202180053792.7.
Indian Office Action dated Mar. 19, 2026 in Application No. 202347012666.

* cited by examiner

FIG. 3

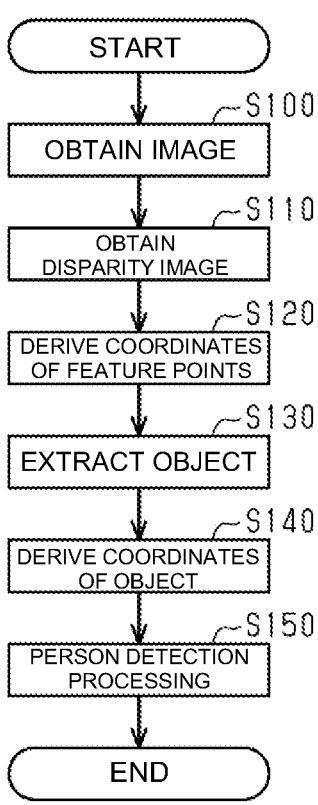

```
        START
          │  S100
   ┌──────▼──────┐
   │ OBTAIN IMAGE │
   └──────┬──────┘
          │  S110
   ┌──────▼──────┐
   │   OBTAIN    │
   │DISPARITY IMAGE│
   └──────┬──────┘
          │  S120
   ┌──────▼──────┐
   │DERIVE COORDINATES│
   │OF FEATURE POINTS │
   └──────┬──────┘
          │  S130
   ┌──────▼──────┐
   │EXTRACT OBJECT│
   └──────┬──────┘
          │  S140
   ┌──────▼──────┐
   │DERIVE COORDINATES│
   │  OF OBJECT  │
   └──────┬──────┘
          │  S150
   ┌──────▼──────┐
   │PERSON DETECTION│
   │ PROCESSING  │
   └──────┬──────┘
          │
        END
```

FIG. 4

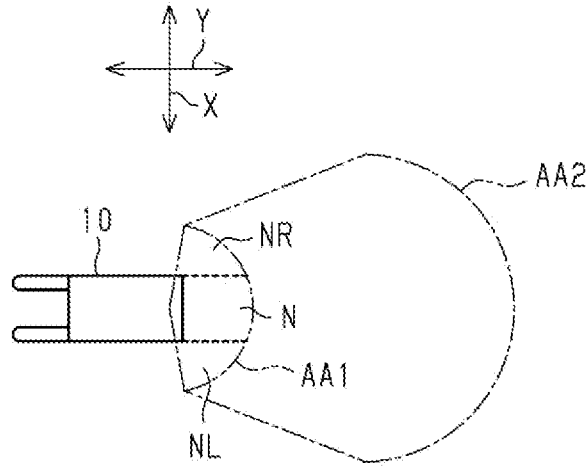

FIG. 9

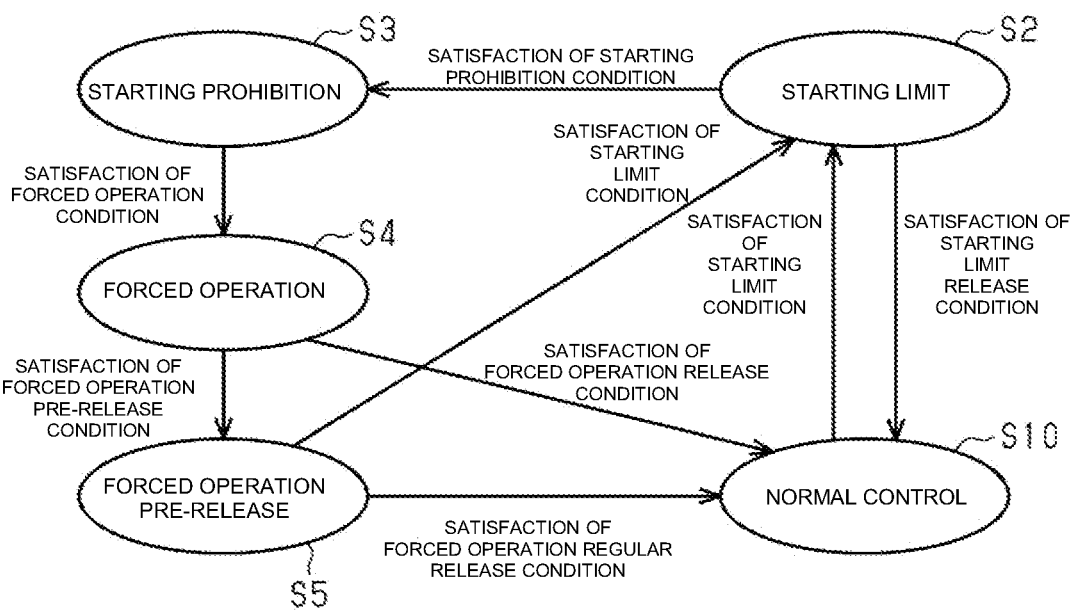

FIG. 10

| CONTROL | STATE | VEHICLE SPEED UPPER LIMIT VALUE | ACCELERATION UPPER LIMIT VALUE | DECELERATION UPPER LIMIT VALUE |
|---|---|---|---|---|
| STARTING LIMIT CONTROL | NORMAL CONTROL STATE | LIMIT NOT IMPOSED | LIMIT NOT IMPOSED | LIMIT NOT IMPOSED |
| | STARTING LIMIT STATE | 0 | LIMIT NOT IMPOSED | LIMIT NOT IMPOSED |
| | STARTING PROHIBITION STATE | 0 | LIMIT NOT IMPOSED | LIMIT NOT IMPOSED |
| | FORCED OPERATION STATE | VS1 | LIMIT NOT IMPOSED | LIMIT NOT IMPOSED |
| | FORCED OPERATION PRE-RELEASE STATE | LIMIT NOT IMPOSED | AS1 | LIMIT NOT IMPOSED |
| TRAVEL LIMIT CONTROL | TRAVEL LIMIT STATE | 0 | LIMIT NOT IMPOSED | DS1 |
| | TRAVEL LIMIT PRE-RELEASE STATE | LIMIT NOT IMPOSED | AS2 | LIMIT NOT IMPOSED |
| VEHICLE SPEED LIMIT CONTROL | LIMIT RELEASE STATE | LIMIT NOT IMPOSED | LIMIT NOT IMPOSED | LIMIT NOT IMPOSED |
| | LIMIT START STATE | MAP VALUE | LIMIT NOT IMPOSED | DS2 |
| | LIMIT PRE-RELEASE STATE | LIMIT NOT IMPOSED | AS3 | LIMIT NOT IMPOSED |

FIG. 11

| OBJECT DETECTION REGION | STARTING LIMIT | | | | | | |
| --- | --- | --- | --- | --- | --- | --- | --- |
| | FORWARD TRAVEL | | | NEUTRAL | BACKWARD TRAVEL | | |
| NL | / | / | / | All | / | / | Left turning |
| NL   N | / | / | / | All | Straight | Right turning | Left turning |
| N | / | / | / | All | Straight | Right turning | Left turning |
| N    NR | / | / | / | All | Straight | Right turning | Left turning |
| NR | / | / | / | All | / | Right turning | / |
| NL   N   NR | / | / | / | All | Straight | Right turning | Left turning |
| NL       NR | / | / | / | All | / | Right turning | Left turning |
| | / | / | / | / | / | / | / |

FIG. 12

| OBJECT DETECTION REGION | NORMAL CONTROL | | | | | | |
| --- | --- | --- | --- | --- | --- | --- | --- |
| | FORWARD TRAVEL | | | NEUTRAL | BACKWARD TRAVEL | | |
| NL | Right turning | Left turning | Straight | / | Straight | Right turning | / |
| NL   N | Right turning | Left turning | Straight | / | / | / | / |
| N | Right turning | Left turning | Straight | / | / | / | / |
| N    NR | Right turning | Left turning | Straight | / | / | / | / |
| NR | Right turning | Left turning | Straight | / | Straight | / | Left turning |
| NL   N   NR | Right turning | Left turning | Straight | / | / | / | / |
| NL       NR | Right turning | Left turning | Straight | / | Straight | / | / |
| | Right turning | Left turning | Straight | All | Straight | Right turning | Left turning |

INDUSTRIAL VEHICLE

CROSS-REFERENCE TO RELATED APPLICATIONS

This application is a National Stage of International Application No. PCT/JP2021/029981 filed Aug. 17, 2021, claiming priority based on Japanese Patent Application No. 2020-146950 filed Sep. 1, 2020, the contents of all of which are incorporated herein by reference in their entirety.

TECHNICAL FIELD

The present disclosure relates to an industrial vehicle.

BACKGROUND ART

An industrial vehicle used in a workplace such as a factory, a commercial facility, or a port may in some cases include a vehicle speed limiting function for setting a vehicle speed limit according to a position of an object present around the industrial vehicle. For example, an industrial vehicle disclosed in Patent Literature 1 includes an object detection unit that detects an object present around the industrial vehicle and a control device that controls vehicle speed of the industrial vehicle. The control device decelerates the industrial vehicle when an object is present in a deceleration control region. The control device stops the industrial vehicle when an object is present in a stop control region.

CITATION LIST

Patent Literature

Patent Literature 1: Japanese Patent Application Publication No. 2015-170284

SUMMARY OF INVENTION

Technical Problem

As disclosed in Patent Literature 1, since the industrial vehicle sets a vehicle speed limit depending on a situation, the industrial vehicle may simultaneously exert a plurality of vehicle speed limiting functions. At this time, the control device may perform a plurality of controls in parallel to exert the plurality of vehicle speed limiting functions. When the plurality of controls are performed in parallel, the vehicle speed limit is individually imposed in the respective controls, which may cause workability of the industrial vehicle to be deteriorated. For example, one of the controls for exerting the plurality of speed limit functions is referred to as first limit and control different from the first control among the controls for exerting the plurality of vehicle speed limiting functions is referred to as second control. It is assumed that, when the industrial vehicle travels while avoiding an object present around the industrial vehicle, the vehicle speed limit is imposed by the first control. At this time, the vehicle speed limit is also imposed by the second control according to the presence of the object present around the industrial vehicle. When a vehicle speed permitted by the vehicle speed limit imposed by the second control is lower than a vehicle speed permitted by the vehicle speed limit imposed by the first control, operation for avoiding an object is hindered by the second control.

An object of the present disclosure is to provide an industrial vehicle that may suppress deterioration in workability.

Solution to Problem

An industrial vehicle that solves the problem is an industrial vehicle including: a driving device; and a travel control device configured to control the driving device, the industrial vehicle including: an object detection unit configured to detect a position of an object present around the industrial vehicle; a first control unit configured to set a limit value, when a vehicle speed of the industrial vehicle is in a first vehicle speed range, for imposing a speed limit including at least one of a vehicle speed limit and an acceleration limit of the industrial vehicle; a second control unit configured to set the limit value when the vehicle speed of the industrial vehicle is in a second vehicle speed range; and a speed limit unit configured to impose the speed limit according to the limit value selected from the limit value set by the first control unit and the limit value set by the second control unit, wherein a lower limit value of the second vehicle speed range is higher than a lower limit value of the first vehicle speed range, the first control unit includes: a starting prohibition control unit that sets the limit value such that traveling of the industrial vehicle is prohibited when the object is detected by the object detection unit, and a starting permission control unit that sets the limit value such that the traveling of the industrial vehicle is permitted when it is determined that an operator of the industrial vehicle recognize the presence of the object, and the speed limit unit imposes the speed limit according to the limit value set by the first control unit when the limit value is set by the starting permission control unit.

The limit value set by the starting permission control unit is a limit value that permits the traveling of the industrial vehicle. Therefore, when the limit value is set by the starting permission control unit, the traveling of the industrial vehicle is possible. When it is determined that the operator of the industrial vehicle recognizes the presence of the object, the limit value by the starting permission control unit is set. Therefore, when the limit value is set by the starting permission control unit, an avoidance operation for avoiding the object may be in place. At this time, if the limit value is set by the second control unit and the speed limit is imposed with the limit value, this becomes a cause of hindering the avoidance operation. When the limit value is set by the starting permission control unit, the speed limit is imposed according to the limit value set by the first control unit, whereby the avoidance operation is prevented from being hindered by the second control unit. Therefore, it is possible to prevent deterioration in workability.

About the industrial vehicle, the industrial vehicle may include: an alarm device; and a predicted track derivation unit configured to derive a predicted track on which the industrial vehicle is predicted to pass, wherein the starting permission control unit includes: a first permission control unit that sets the limit value and causes the alarm device to issue an alarm, and a second permission control unit that sets the limit value and does not cause the alarm device to issue the alarm, and the speed limit unit may impose the speed limit according to the limit value set by the first control unit when the limit value is set by the second permission control unit and the object is not present in the predicted track derivation unit.

About the industrial vehicle, the speed limit unit may impose the speed limit according to the limit value set by the first control unit when the limit value is set by the starting prohibition control unit or when the limit value is set by the starting permission control unit.

Advantageous Effect of Invention

According to the present disclosure, it is possible to prevent deterioration in workability.

BRIEF DESCRIPTION OF DRAWINGS

FIG. 3 is a flowchart showing processing performed by an obstacle detection device.

FIG. 4 is a diagram schematically showing an automatic deceleration area and a travel start restriction area.

FIG. 9 is a state transition diagram of starting limit control.

FIG. 10 is a table showing a corresponding relationship between states to which a main control device transitions and a vehicle speed upper limit value, an acceleration upper limit value, and a deceleration upper limit value.

FIG. 11 is a table for explaining satisfaction of starting limit conditions.

FIG. 12 is a table for explaining satisfaction of starting limit release conditions.

DESCRIPTION OF EMBODIMENT

An embodiment of an industrial vehicle will be described below.

Figure 1:
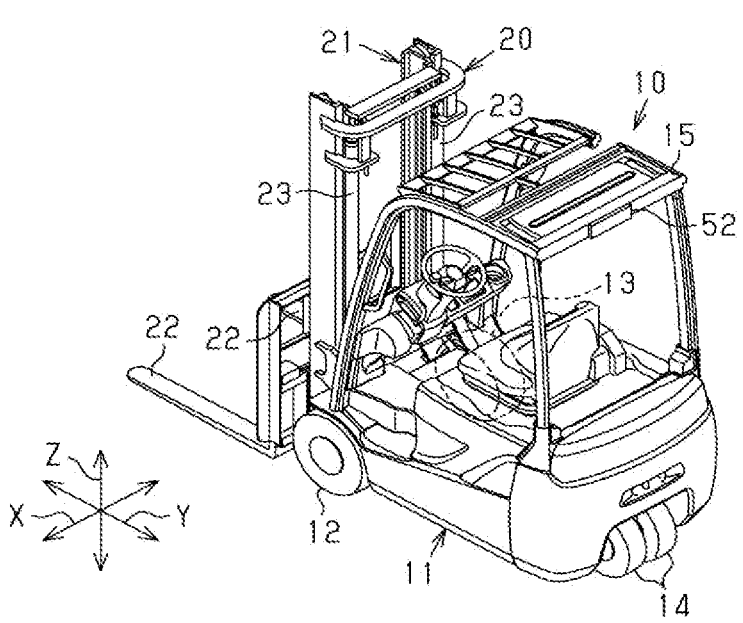
FIG. 1 is a perspective view of a forklift truck.

As illustrated in FIG. 1, a forklift truck track 10 as an example of an industrial vehicle includes a vehicle body 11, two driving wheels 12 and 13 disposed in the lower front of the vehicle body 11, two steering wheels 14 disposed in the lower rear part of the vehicle body 11, and a cargo handling device 20. The driving wheels 12 and 13 are spaced in a vehicle width direction. The two steering wheels 14 are disposed adjacent to each other in the vehicle width direction. The two steering wheels 14 are disposed at a center position between the driving wheels 12 and 13 in the vehicle width direction. When the two steering wheels 14 disposed adjacent to each other are regarded as one steering wheel 14, the forklift truck 10 may be regarded as a three-wheel type forklift truck. The vehicle body 11 includes a head guard 15 provided above a driver's seat. In the following description, front, rear, left, and right indicate the front, rear, left, and right of the forklift truck 10.

The cargo handling device 20 includes a mast 21 erected in a front part of the vehicle body 11, a pair of forks 22 movable up and down together with the mast 21, and lift cylinders 23 that cause the mast 21 to move up and down. A cargo is loaded on the forks 22. The lift cylinders 23 are hydraulic cylinders. When the mast 21 moves up and down with extension and contraction of the lift cylinders 23, the forks 22 moves up and down accordingly. In the forklift truck 10 of the present embodiment, an operator performs a traveling operation and a cargo handling operation.

Figure 2:
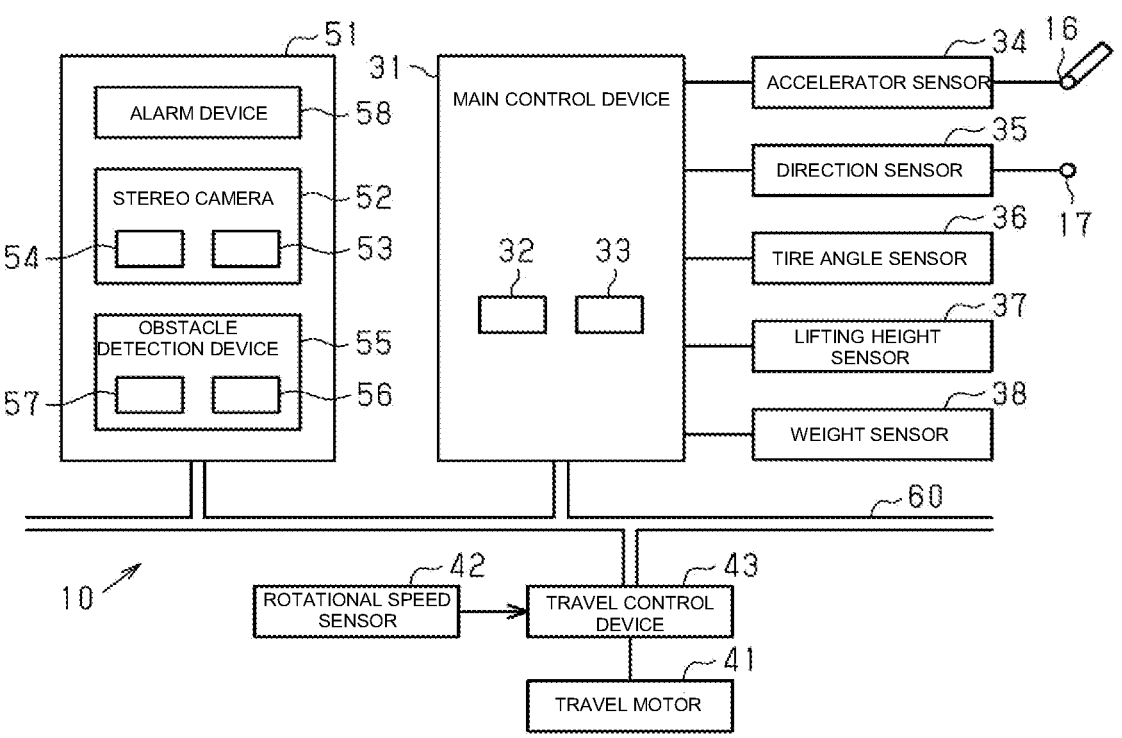
FIG. 2 is a schematic configuration diagram of the forklift truck.

As illustrated in FIG. 2, the forklift truck 10 includes an accelerator pedal 16, a direction lever 17, a main control device 31, an accelerator sensor 34, a direction sensor 35, a tire angle sensor 36, a lifting height sensor 37, a weight sensor 38, a travel motor 41, a rotational speed sensor 42, a travel control device 43, an object detection unit 51, and a bus 60.

The main control device 31 includes a processor 32 and a storage unit 33. As the processor 32, for example, a CPU (Central Processing Unit), a GPU (Graphics Processing Unit), or a DSP (Digital Signal Processor) is used. The storage unit 33 includes a RAM (Random Access Memory) and a ROM (Read Only Memory). The memory 33 stores various programs to operate the forklift truck 10. The storage unit 33 stores program codes or commands configured to cause the processor 32 to execute processing. The storage unit 33, that is, a computer-readable medium includes all usable media accessible by a general-purpose or a dedicated computer. The main control device 31 may be configured by a hardware circuit such as an ASIC (Application Specific Integrated Circuit) or an FPGA (Field Programmable Gate Array). The main control device 31, which is a processing circuit, may include one or more processors that operate according to a computer program, one or more hardware circuits such as an ASIC and an FPGA, or a combination of the processors and the hardware circuits.

The accelerator sensor 34 detects an operation amount, that is, an accelerator opening degree of the accelerator pedal 16. The accelerator sensor 34 outputs an electric signal corresponding to the accelerator opening degree to the main control device 31. The main control device 31 is capable of recognizing the accelerator opening degree based on the electric signal output from the accelerator sensor 34.

The direction sensor 35 detects an operation direction of the direction lever 17 that instructs a travel direction. The direction sensor 35 detects whether the direction lever 17 is operated in a direction for instructing forward travel or the direction lever 17 is operated in a direction for instructing backward travel, with respect to a neutral position as a reference position. The direction sensor 35 outputs an electric signal corresponding to the operation direction of the direction lever 17 to the main control device 31. The main control device 31 is capable of recognizing the operation direction of the direction lever 17 based on the electric signal output from the direction sensor 35. The main control device 31 may recognize whether the forward travel is instructed, the backward travel is instructed, or both of the forward travel and the backward travel are not instructed by the operator.

The tire angle sensor 36 detects a steering angle of the steering wheels 14. The tire angle sensor 36 outputs an electric signal corresponding to the steering angle to the main control device 31. The main control device 31 is capable of recognizing the steering angle based on the electric signal output from the tire angle sensor 36.

The lifting height sensor 37 detects a lifting height of the cargo handling device 20. The lifting height of the cargo handling device 20 is the height from a road surface to the forks 22. The lifting height sensor 37 is, for example, a reel sensor. The lifting height sensor 37 outputs an electric signal corresponding to the lifting height to the main control device 31. The main control device 31 is capable of recognizing the lifting height of the cargo handling device 20 based on the electric signal output from the lifting height sensor 37.

The weight sensor 38 detects the weight of a cargo loaded on the cargo handling device 20. The weight sensor 38 is, for example, a pressure sensor that detects the hydraulic pressure of the lift cylinders 23. The weight sensor 38 outputs an electric signal corresponding to the weight of the cargo to the main control device 31. The main control device 31 is capable of recognizing the weight of the cargo based on the electric signal output from the weight sensor 38.

The travel motor 41 is a driving device for causing the forklift truck 10 to travel. The driving wheels 12 and 13 rotate according to driving of the travel motor 41, whereby the forklift truck 10 travels.

The rotational speed sensor 42 detects the rotational speed of the travel motor 41. As the rotational speed sensor 42, for example, a rotary encoder may be used. The rotational speed sensor 42 outputs an electric signal corresponding to the rotational speed of the travel motor 41 to the travel control device 43.

The travel control device 43 is a motor driver that controls the rotational speed of the travel motor 41. The travel control device 43 is capable of recognizing the rotational speed and the rotational direction of the travel motor 41 based on the electric signal of the rotational speed sensor 42. The rotational direction of the travel motor 41 is represented by + and − signs. The + rotational speed indicates regular rotation and the − sign indicates reverse rotation.

The travel motor 41, the rotational speed sensor 42, and the travel control device 43 are individually provided for each of the two driving wheels 12 and 13. The rotational speed and the rotational direction of the travel motor 41 provided for each of the two driving wheels 12 and 13 are individually controlled by the travel control device 43, whereby the rotational speeds and the rotational directions of the two driving wheels 12 and 13 can be independently controlled. The rotational speed of the travel motor 41 provided for each of the two driving wheels 12 and 13 can be individually detected by the rotational speed sensor 42.

The object detection unit 51 includes a stereo camera 52, an obstacle detection device 55 that detects an object from an image captured by the stereo camera 52, and an alarm device 58. As illustrated in FIG. 1, the stereo camera 52 is disposed in the head guard 15. the stereo camera 52 disposed so that the road surface on which the forklift truck 10 travels can be seen from above the forklift truck 10. The stereo camera 52 of the present embodiment captures an image of an area behind the forklift truck 10. Therefore, the object detected by the obstacle detection device 55 is an object present in the rear of the forklift truck 10. The alarm device 58 and the obstacle detection device 55 may be unitized with the stereo camera 52 and disposed in the head guard 15 together with the stereo camera 52. The alarm device 58 and the obstacle detection device 55 may be disposed in a position different from the head guard 15.

As illustrated in FIG. 2, the stereo camera 52 includes two cameras 53 and 54. The cameras 53 and 54 are cameras using, for example, a CCD image sensor or a CMOS image sensor. The cameras 53 and 54 are disposed such that the optical axes thereof are parallel to each other. Since the two cameras 53 and 54 are spaced from each other, the same object is reflected to deviate in images captured by the two cameras 53 and 54. Specifically, when the same object is captured, deviation of pixels corresponding to the distance between the two cameras 53 and 54 occurs in the object reflected in the images captured by the two cameras 53 and 54. As the stereo camera 52 in the present embodiment, a wide-angle stereo camera, a horizontal angle of view of which is 100° or more is used. However, a non-wide-angle stereo camera may be used as the stereo camera 52.

The obstacle detection device 55 includes a processor 56 and a storage unit 57. As the processor 56, for example, a CPU, a GPU, or a DSP is used. The storage unit 57 includes a RAM and a ROM. Various programs for detecting an object from an image captured by the stereo camera 52 are stored in the storage unit 57. The storage unit 57 stores program codes or commands configured to cause the processor 56 to execute processing. The storage unit 57, that is, the computer-readable medium includes all usable media accessible by a general-purpose or dedicated computer. The obstacle detection device 55 may be configured by a hardware circuit such as an ASIC or an FPGA. The obstacle detection device 55, which is a processing circuit, can include one or more processors that operate according to a computer program, one or more hardware circuits such as ASICs or FPGAs, or a combination of the processors or the hardware circuits.

The obstacle detection device 55 repeatedly performs the processing described above at a predetermined control period to detect an object present around the forklift truck 10. The obstacle detection device 55 derives a position of the detected object. The position of the object is a position of the object relative to the forklift truck 10.

As illustrated in FIG. 3, at Step S100, the obstacle detection device 55 obtains images from the cameras 53 and 54 of the stereo camera 52.

Subsequently, at Step S110, the obstacle detection device 55 performs stereo processing to obtain a disparity image. The disparity image is an image in which disparity [px] is associated with pixels. The disparity image is not always required to be displayed and indicates data in which disparity is associated with pixels in the disparity image. The disparity is obtained by comparing images captured by the two cameras 53 and 54 included in the stereo camera 52 and deriving a difference in the number of pixels between the images about the same feature points reflected in the images. The obstacle detection device 55 sets one of the images captured by the two cameras 53 and 54 as a reference image and sets the other as a comparative image and extracts, for each of pixels of the reference image, a pixel of the comparative image most similar to the pixel. The obstacle detection device 55 calculates a difference between the numbers of pixels of the reference image and the comparative image as the disparity. Consequently, it is possible to obtain a disparity image in which the disparity is associated with the pixels of the reference image. It is noted that the feature point is a portion recognizable as a border such as an edge of an object. The feature point may be detected from brightness information or the like.

Next, at Step S120, the obstacle detection device 55 derives coordinates of feature points in a world coordinate system that is a coordinate system in a real space. The world coordinate system is a coordinate system in which, in a state in which the forklift truck 10 is located on a horizontal plane, an axis extending in the vehicle width direction of the forklift truck 10 in a horizontal direction is an X axis, an axis orthogonal to the X axis in the horizontal direction is a Y axis, and an axis extending in a vertical direction is a Z axis. The coordinates of the feature points are derived by deriving coordinates of the feature points in a camera coordinate system from a base line length of the stereo camera 52, a focal length of the stereo camera 52, and the disparity image obtained at Step S110 and thereafter converting the coordinates into coordinates in the world coordinate system. As illustrated in FIG. 1, the X-axis, the Y-axis, and the Z-axis are represented by arrows X, Y, and Z.

As illustrated in FIG. 3, at Step S130, the obstacle detection device 55 extracts an object by clustering the feature points. The obstacle detection device 55 recognizes, as one point group, a set of feature points assumed to represent the same object among feature points that are points representing a part of the object and extracts the point group as the object. The obstacle detection device 55 performs clustering to recognize the feature points positioned in a predetermined range as one point group based on the coordinates of the feature points in the world coordinate system derived at Step S120. The obstacle detection device 55 recognizes the clustered point group as one object. The clustering of the feature points at Step S130 may be performed by various methods.

Subsequently, at Step S140, the obstacle detection device 55 derives coordinates of the object in the world coordinate system. The coordinates of the object can be derived from the coordinates of the feature points forming the point group. The coordinates of the object in the world coordinate system represent a position of the object relative to the forklift truck 10. Specifically, in the coordinates of the object in the world coordinate system, an X coordinate of the coordinate of the object represents the distance in a left-right direction from the origin to the object and a Y coordinate represents the distance in a front-rear direction from the origin to the object. The origin corresponds to, for example, coordinates in which the X-coordinate and the Y-coordinate represent a position of the stereo camera 52 and a Z-coordinate represents the road surface. Euclidean distance from the position of the stereo camera 52 to the object may be derived from the X-coordinate and the Y-coordinate. The Z coordinate among coordinates of the object in the world coordinate system represents the height of the object from the road surface.

Subsequently, at Step S150, the obstacle detection device 55 determines whether the object is a person or an obstacle other than the person. Whether the object is the person may be determined by various methods. In the present embodiment, the obstacle detection device 55 performs person detection processing for an image captured by one of the two cameras 53 and 54 of the stereo camera 52. The obstacle detection device 55 converts the coordinate of the object in the world coordinate system obtained at Step S140 into a camera coordinate and converts the camera coordinate into a coordinate of the image captured by the camera 53 or 54. In the present embodiment, the obstacle detection device 55 converts the coordinate of the object in the world coordinate system into a coordinate of the reference image. The obstacle detection device 55 performs the person detection processing for the coordinate of the obstacle in the reference image. The person detection processing is performed using, for example, feature value extraction and a person determiner that has subjected to machine learning beforehand. Examples of the feature value detection include a method of extracting a feature value of a local region in an image such as an HOG: Histogram of Oriented Gradients feature value or a Haar-Like feature value. As the person determiner, for example, a person determiner that has subjected to machine learning by a supervised learning model is used. For example, the supervised learning model having an algorithm such as a support vector machine, a neural network, naive Bayes, deep learning, and a decision tree is employed.

Training data used for the machine learning include an image specific component such as a shape element of the person or an exterior element extracted from an image. Examples of the shape element include a size and a contour of the person. Examples of the exterior element include light source information, texture information, and camera information. The light source information includes information concerning reflectance, a shadow, and the like. The texture information includes color information and the like. The camera information includes information concerning image quality, resolution, an angle of view, and the like.

The alarm device 58 is a device that issues an alarm to the operator of the forklift truck 10. Examples of the alarm device 58 include a buzzer that issues an alarm by sound, a lamp that issues an alarm by light, and a combination of the buzzer and the lamp.

The main control device 31, the travel control device 43, and the object detection unit 51 are connected to one another to be capable of acquiring information through the bus 60. The controller 31, the travel control device 43, and the object detection unit 51 obtain the information from each other through communication in accordance with a communication protocol for the vehicle, such as CAN (Controller Area Network) or LIN (Local Interconnect Network).

The main control device 31 obtains the rotational speed and the rotational direction of the travel motor 41 from the travel control device 43 and obtains the steering angle from the tire angle sensor 36 to derive vehicle speed of the forklift truck 10. The vehicle speed of the forklift truck 10 is derived based on the rotational speed and the rotational direction of each of travel motors 41 provided for each of the driving wheels 12 and 13, a gear ratio, an outer diameter of the driving wheels 12 and 13, a steering angle detected by the tire angle sensor 36, and the like. It is noted that the main control device 31 derives a travel direction of the forklift truck 10 as well together with the vehicle speed. The travel direction of the forklift truck 10 is one of a forward travel direction and a backward travel direction. The travel direction of the forklift truck 10 is represented by + and − signs added to the vehicle speed. The + vehicle speed indicates the forward travel direction and the − sign indicates the backward travel direction. It is noted that, in the present embodiment, the vehicle speed indicates vehicle speed excluding the + and − signs. That is, the vehicle speed in the present embodiment indicates the absolute value of the vehicle speed.

The main control device 31 transmits an alarm command through the bus 60 to actuate the alarm device 58. Specifically, the object detection unit 51 includes an actuating unit that actuates the alarm device 58. When receiving the alarm command, the actuating unit actuates the alarm device 58.

Next, a vehicle speed control performed in the forklift truck 10 will be described.

In the forklift truck 10, the vehicle speed control is performed by the main control device 31 according to a position of an object detected by the object detection unit 51 and a type of the object. The type of the object is one of a person and an obstacle other than the person. In the following explanation, the obstacle indicates the object other than the person. The vehicle speed control includes an automatic deceleration control and a starting limit control.

As illustrated in FIG. 4, in an object detectable range by the object detection unit 51, an automatic deceleration area AA2 used for the automatic deceleration control and a starting limit area AA1 used for the starting limit control are set. The object detectable range by the object detection unit 51 is considered a range where the stereo camera 52 can capture an image. In the present embodiment, the automatic deceleration area AA2 is the same region as the object detectable range by the object detection unit 51. The automatic deceleration area AA2 is a region expanding in the rear of the forklift truck 10 and the vehicle width direction of the forklift truck 10 from the position of the stereo camera 52. The automatic deceleration area AA2 is an area specified by an X coordinate and a Y coordinate in the world coordinate system. The starting limit area AA1 is an area set in the automatic deceleration area AA2 and is an area narrower than the automatic deceleration area AA2. The starting limit area AA1 is a region expanding in the rear of the forklift truck 10 and the vehicle width direction of the forklift truck 10 from the position of the stereo camera 52. The starting limit area AA1 is an area specified by an X coordinate and a Y coordinate in the world coordinate system. The automatic deceleration area AA2 is considered an area including a position farther away from the forklift truck 10 than the starting limit area AA1.

In the present embodiment, the starting limit area AA1 is divided into three regions, that is, a center region N, a left region NL located on the left of the center region N, and a right region NR located on the right of the center region N. The center region N is a region facing the forklift truck 10 in the front-rear direction. A dimension in the left-right direction of the center region N coincides with a dimension of the forklift truck 10 in the vehicle width direction. The center region N is also considered as a region where the forklift truck 10 passes when the forklift truck 10 is moved straight in the backward travel direction. The left region NL is considered a region where the forklift truck 10 passes when the forklift truck 10 is turned left in the backward travel direction. The right direction NR is considered a region where the forklift truck 10 passes when the forklift truck 10 is turned right in the backward travel direction.

Figure 5:
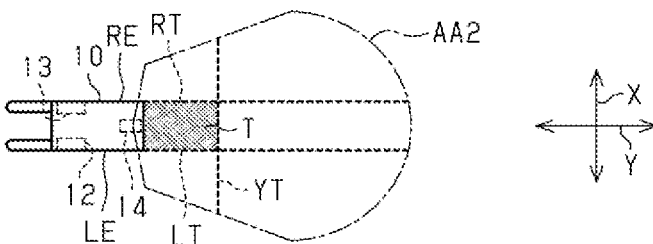
FIG. 5 is a diagram schematically showing a predicted track.

As illustrated in FIG. 5, the main control device 31 derives a predicted track T of the forklift truck 10. The predicted track T is a track on which the forklift truck 10 is predicted to pass. In the present embodiment, in a case in which the travel direction of the forklift truck 10 is the backward travel direction, the main control device 31 derives the predicted track T on which the forklift truck 10 is predicted to pass when the direction lever 17 is operated in a direction in which the backward travel is instructed by the operator.

The predicted track T may be derived from a steering angle of the steering wheels 14 and dimension information of the forklift truck 10. The dimension information of the forklift truck 10 includes a dimension [mm] from the center axis of the driving wheels 12 and 13 at the rear end of the vehicle body 11, a wheelbase [mm], and a vehicle width [mm]. Since the dimension information of the forklift truck 10 is known information, the dimension information of the forklift truck 10 may be stored in advance in, for example, the storage unit 33 of the main control device 31. The predicted track T is a track between a track LT on which a left end LE of the vehicle body 11 passes and a track RT on which a right end RE of the vehicle body 11 passes. The main control device 31 derives an X coordinate and a Y coordinate in the world coordinate system of the predicted track T extending in the rear of the forklift truck 10.

Figure 6:
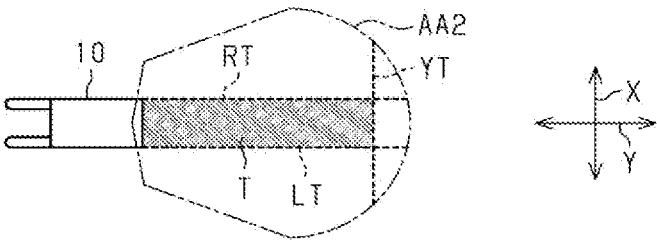
FIG. 6 is a diagram schematically showing a predicted track in a case in which vehicle speed of the forklift truck is increased.
Figure 7:
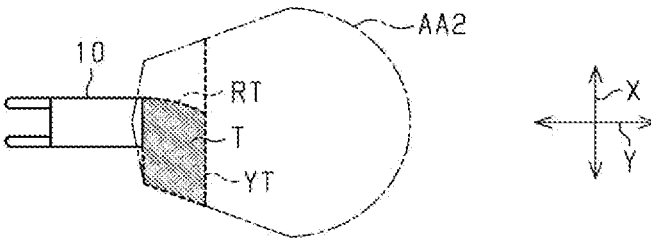
FIG. 7 is a diagram schematically showing a predicted track in a case in which the forklift truck is turning.
Figure 8:
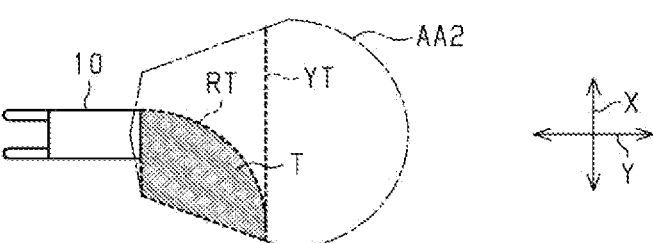
FIG. 8 is a diagram schematically showing a predicted track in a case in which the vehicle speed of the forklift truck is increased in a state in which the forklift truck is turning.

As illustrated in FIG. 5 and FIG. 6, when the forklift truck 10 is traveling straight, the predicted track T is a track extending linearly from the forklift truck 10 in the backward travel direction. As illustrated in FIG. 7 and FIG. 8, when the forklift truck 10 is turning, the predicted track T is a track curving from the forklift truck 10 in the backward travel direction. When the forklift truck 10 is turning to the right, the predicted track T extends to the right. When the forklift truck 10 is turning to the left, the predicted track T extends to the left. When the forklift truck 10 is turning, the main control device 31 derives the predicted track T extending toward a turning direction.

A vehicle speed of the forklift truck 10 shown in FIG. 6 is higher than that of the forklift truck 10 in the state shown in FIG. 5. Similarly, the vehicle speed of the forklift truck 10 shown in FIG. 8 is higher than that of the forklift truck 10 shown in FIG. 7. As illustrated in FIG. 5 to FIG. 8, the main control device 31 forms the predicted track T longer in a travel direction as the vehicle speed of the forklift truck 10 is higher. In the present embodiment, a track derivation threshold YT is changed according to the vehicle speed. The track derivation threshold YT is a threshold set for a Y coordinate in the world coordinate system. The Y coordinate is farther away from the forklift truck 10 as the vehicle speed is higher. The main control device 31 derives the predicted track T from the forklift truck 10 to the track derivation threshold YT. It is noted that forming the predicted track T longer in the travel direction as the vehicle speed of the forklift truck 10 is higher is not limited to a mode in which the vehicle speed of the forklift truck 10 and the length of the predicted track T in the travel direction are in a proportional relation. There only has to be a correlation in which the length of the predicted track T in the travel direction is longer as the vehicle speed of the forklift truck 10 is higher.

The predicted track T is derived in the automatic deceleration area AA2. Examples of a minimum value of the track derivation threshold YT include a Y coordinate of a position most away from the forklift truck 10 in the starting limit area AA1. That is, the track derivation threshold YT is set such that at least the predicted track T in the starting limit area AA1 is derived even if the forklift truck 10 is stopped and the vehicle speed is 0 [km/h]. In the present embodiment, the main control device 31 functions as the predicted track derivation unit.

The starting limit control will be described. It is noted that an X coordinate and a Y coordinate in the following explanation are an X coordinate and a Y coordinate in the world coordinate system.

As shown in FIG. 9, in the starting limit control, by setting a state of the main control device 31 to any one of a normal control state S10, a starting limit state S2, a starting prohibition state S3, a forced operation state S4, and a forced operation pre-release state S5.

As shown in FIG. 10, the normal control state S10 is a state in which a vehicle speed limit is not imposed. In the normal control state S10, a limit is not imposed on acceleration and deceleration either. When the main control device 31 is in the normal control state S10, the main control device 31 calculates target vehicle speed from an accelerator opening degree detected by the accelerator sensor 34. The main control device 31 calculates target rotational speed from the target vehicle speed. The target rotational speed is a rotational speed for causing the forklift truck 10 to reach the target vehicle speed. The target rotational speed is individually derived for each of the two travel motors 41. The main control device 31 determines whether to cause the forklift truck 10 to travel forward or travel backward from the operation direction of the direction lever 17. The main control device 31 generates a command including information indicating the target rotational speed and information indicating the rotational direction of the travel motor 41 and gives the command to the travel control device 43. The travel control device 43 controls the travel motor 41 to follow the target rotational speed by the command. The travel control device 43 controls the travel motor 41 to rotate in the rotational direction by the command. Consequently, in the normal control state S10, the forklift truck 10 travels at vehicle speed corresponding to an operation amount of the accelerator pedal 16 by the operator. It is noted that, in the forklift truck 10 that may independently control the rotational speeds of the two driving wheels 12 and 13 as in the present embodiment, the turn of the forklift truck 10 may be achieved by adjusting the rotational speeds and the rotational directions of the two travel motors 41 according to turning operation by the operator, that is, an angle of a steering wheel. Therefore, in the case of the forklift truck 10 that turns using a difference between the rotational speeds of the two travel motors 41, the main control device 31 derives the target rotational speed according to the target vehicle speed and the angle of the steering wheel.

It is noted that the state in which the vehicle speed limit is not imposed includes, in addition to a mode in which a vehicle speed upper limit value is not set, a mode in which a vehicle speed upper limit value that does not practically function is set, for example, a vehicle speed upper limit value higher than maximum speed that the forklift truck 10 can reach is set. Similarly, the state in which an acceleration limit is not imposed includes, in addition to a mode in which an acceleration upper limit value is not set, a mode in which an acceleration upper limit value that does not practically function is set, for example, the acceleration higher than the maximum acceleration that the forklift truck 10 can reach is set. A deceleration limit is set similarly to the acceleration limit. A state in which at least one of the vehicle speed limit and the acceleration limit is imposed is a state in which the speed limit is imposed. The vehicle speed upper limit value and the acceleration upper limit value are limit values for imposing the speed limit.

As illustrated in FIG. 9, if a starting limit condition is satisfied when the main control device 31 is in the normal control state S10, the main control device 31 transitions from the normal control state S10 to the starting limit state S2. The satisfaction of the starting limit condition means that all of the following conditions A1, A2, and A3 are satisfied.

Condition A1 . . . An object is present in the starting limit area AA1.

Condition A2 . . . A detection result of the direction sensor 35 is the neutral or the detection result of the direction sensor 35 is the backward travel and the region N, NL, or NR where the object is present, and a direction of the predicted track T coincide.

Condition A3 . . . The forklift truck 10 is stopped.

The object in the condition A1 may be a person or may be an obstacle other than the person. As described above, the obstacle detection device 55 derives a position of the object and, thereafter, determines whether the object is the person or the obstacle. Since a time required for determining whether the object is the person is long, the obstacle detection device 55 may be configured to transmit information indicating the position of the object to the main control device 31 and, thereafter, transmit information about whether the object is the person. Since the main control device 31 may determine that the condition A1 is satisfied at a stage when the position of the object is recognized, it is possible to improve determination speed compared with when it is determined whether the condition A1 is satisfied after the determination about whether the object is the person or the obstacle is made. Whether the condition A1 is satisfied may be determined from an X coordinate and a Y coordinate of the object. Since the starting limit area AA1 is specified by an X coordinate and a Y coordinate, it is possible to determine from the X coordinate and the Y coordinate of the object whether the object is present in the starting limit area AA1.

A state in which the region N, NL, or NR where the object is present and the direction of the predicted track T coincide may also be considered as a state in which a region where the object is present among the center region N, the left region NL, and the right region NR obtained by dividing the starting limit area AA1 and the predicted track T overlap. That is, the state may be considered as a state in which the object is present inside the predicted track T. When one object is located across a plurality of regions N, NL, and NR and when a plurality of objects are located in different regions N, NL, and NR, the main control device 31 determines that the object is present in the regions N, NL, and NR. In this case, the main control device 31 determines that the condition A2 is satisfied when any one of the regions N, NL, and NR where the object is present and the direction of the predicted track T coincide.

The condition A1 and the condition A2 may be represented by a table shown in FIG. 11. In FIG. 11, a corresponding relationship between the regions N, NL, and NR where the object is present and the detection result of the direction sensor 35 and the predicted track T when the condition A1 and the condition A2 are satisfied is shown. "ALL" shown in FIG. 11 indicates that the predicted track T may extend in any direction. "Left turning" shown in FIG. 11 indicates that the predicted track T extends to the left. "Right turning" shown in FIG. 11 indicates that the predicted track T extends to the right. As shown in FIG. 11, when the object is present in the starting limit area AA1 and when the detection result of the direction sensor 35 is the neutral, the conditions A1 and A2 are considered to be satisfied irrespective of a direction in which the predicted track T extends. When the object is present in the left region NL, the condition A1 and the condition A2 are satisfied when the detection result of the direction sensor 35 is the backward travel and the predicted track T (the turning direction) is on the left in addition to when the detection result of the direction sensor 35 is the neutral. When the objects are present in the left region NL and the right region NR and no object is present in the center region N, the condition A1 and the condition A2 are satisfied when the detection result of the direction sensor 35 is the backward travel and the predicted track T extends to the right or the left. Since the forklift truck 10 passes the center region N even when turning, when the object is present in the center region N, the condition A1 and the condition A2 are satisfied irrespective of directions in which the predicted track T extends.

Whether the condition A3 is satisfied may be determined from the vehicle speed calculated by the main control device 31. When the vehicle speed is at a stop determination threshold [km/h] or less, the main control device 31 determines that the forklift truck 10 is stopped. The stop determination threshold is set to a value with which the forklift truck 10 can be regarded as being stopped. The stop determination threshold may be set to any value from, for example, 0 [km/h] to 0.5 [km/h].

As shown in FIG. 10, the starting limit state S2 is a state in which starting of the forklift truck from the state in which the forklift truck 10 is stopped is prohibited by setting the vehicle speed upper limit value is set to 0. It is noted that starting means that the forklift truck 10 is caused to transition from the state in which the forklift truck 10 is stopped to a state in which the forklift truck 10 is traveling. When the vehicle speed upper limit value is set, the main control device 31 performs a control such that the vehicle speed of the forklift truck 10 does not exceed the vehicle speed upper limit value. For example, when the target vehicle speed calculated from an accelerator opening degree is smaller than the vehicle speed upper limit value, the main control device 31 calculates the target rotational speed from the target vehicle speed calculated from the accelerator opening degree. On the other hand, when the target vehicle speed calculated from the accelerator opening degree is equal to or larger than the vehicle speed upper limit value, the main control device 31 calculates the target rotational speed using the vehicle speed upper limit value, instead of the target vehicle speed. The main control device 31 gives a command to the travel control device 43 such that the target rotational speed and the rotational speed of the travel motor 41 coincide. When the vehicle speed upper limit value is 0, this is considered to be a state in which traveling of the forklift truck 10 is prohibited. The main control device 31 permits traveling at the vehicle speed upper limit value or less and, on the other hand, limits traveling at speed exceeding the vehicle speed upper limit value. The main control device 31 functions as the speed limit unit that imposes a speed limit according to the vehicle speed upper limit value. In the starting limit state S2, an alarm by the alarm device 58 is issued.

As illustrated in FIG. 9, if a starting limit release condition is satisfied when the main control device 31 is in the starting limit state S2, the main control device 31 transitions from the starting limit state S2 to the normal control state S10. The satisfaction of the starting limit release condition means that at least any one of the following conditions B1, B2, and B3 is satisfied.

Condition B1 . . . No object is present in the starting limit area AA1.

Condition B2 . . . The detection result of the direction sensor 35 is the forward travel.

Condition B3 . . . The detection result of the direction sensor 35 is the backward travel, and the region N, NL, or NR where the object is present, and the direction of the predicted track T do not coincide.

The conditions B1, B2, and B3 may be represented by a table shown in FIG. 12. In FIG. 12, a corresponding relationship between the region N, NL, or NR where the object is present and the detection result of the direction sensor 35 and the predicted track T in the case in which the conditions B1, B2, and B3 are satisfied is shown. "All", "right turning", and "left turning" shown in FIG. 12 have the same meanings as those shown in FIG. 11. As shown in FIG. 12, the condition B1 is satisfied, irrespective of the detection result of the direction sensor 35 when no object is present in the starting limit area AA1. The condition B2 is satisfied when the detection result of the direction sensor is the forward travel even when the object is present in the starting limit area AA1. The condition B3 is satisfied when the region N, NL, or NR where the object is present and the direction of the predicted track T do not coincide even when the object is present in the starting limit area AA1. The starting limit release condition is considered to be satisfied when at least one of the conditions A1 and A2 is not satisfied.

As illustrated in FIG. 9, when a starting prohibition condition is satisfied while the main control device 31 is in the starting limit state S2, the main control device 31 transitions from the starting limit state S2 to the starting prohibition state S3. The satisfaction of the starting prohibition condition means that all of the following conditions C1 and C2 are satisfied. It is noted that when both of the starting prohibition condition and the starting limit release condition are satisfied, the main control device 31 prioritizes the starting limit release condition and transitions to the normal control state S10.

Condition C1 . . . The detection result of the direction sensor 35 is other than the neutral.

Condition C2 . . . Accelerator is ON.

The condition C1 is satisfied when the detection result of the direction sensor 35 is the forward travel or the backward travel. In the starting limit state S2, if the detection result of the direction sensor 35 is the forward travel, the main control device 31 transitions to the normal control state S10 upon the satisfaction of the condition B2. Therefore, the condition C1 is considered to be satisfied when the detection result of the direction sensor 35 is the backward travel.

The accelerator being ON indicates that the accelerator pedal 16 is operated by the operator of the forklift truck 10. It is possible to determine that the accelerator pedal 16 is operated from a detection result of the accelerator sensor 34. It is noted that the accelerator being ON also includes operation of the accelerator pedal 16 in play (a dead zone region) of the accelerator pedal 16.

As shown in FIG. 10, the starting prohibition state S3 is a state in which the travel start of the forklift truck 10 is prohibited by setting the vehicle speed upper limit value to 0. The starting prohibition state S3 is considered a state in which the same vehicle speed limit as the vehicle speed limit in the starting limit state S2 is imposed. The starting prohibition state S3 and the starting limit state S2 are different in a transition mode to another state such as whether transition to the normal control state S10 is permitted. In the starting prohibition state S3, the alarm by the alarm device 58 may be set stronger than the alarm in starting limit state S2. Examples of the setting the alarm stronger include, when the alarm device 58 is a buzzer, the buzzer sound is loudened, when the alarm device 58 is a combination of a lamp and a buzzer, switching an alarm of one of the lamp and the buzzer to alarms of both of the lamp and the buzzer. That is, setting the alarm stronger allows the operator to recognize that the object is present inside the predicted track T more easily.

As illustrated in FIG. 9, if a forced operation condition is satisfied when the main control device 31 is in the starting prohibition state S3, the main control device 31 transitions from the starting prohibition state S3 to the forced operation state S4. The satisfaction of the forced operation condition means that the following condition D1 is satisfied.

Condition D1 . . . Accelerator is OFF.

The accelerator being OFF indicates that the accelerator pedal 16 is not operated by the operator of the forklift truck 10. It is possible to determine that the accelerator pedal 16 is not operated from the detection result of the accelerator sensor 34. The condition D1 is considered to be satisfied when the condition C2 is not satisfied.

As shown in FIG. 10, the forced operation state S4 is a state in which the vehicle speed limit is imposed on the forklift truck 10 by setting the vehicle speed upper limit value to VS1 [km/h]. VS1 is a value larger than 0 and is a value lower than maximum vehicle speed that the forklift truck 10 can reach. The main control device 31 is considered to permit the traveling of the forklift truck 10 at VS1 or less. As VS1, for example, a vehicle speed permitted at a retraction travel time of the forklift truck 10 is set. It is noted that, in the forced operation state S4, a limit is not imposed on the acceleration and the deceleration. In the forced operation state S4, an alarm by the alarm device 58 is issued. In the forced operation state S4, the alarm by the alarm device 58 may be set weaker than the alarm in the starting prohibition state S3.

As illustrated in FIG. 9, if a forced operation release condition is satisfied when the main control device 31 is in the forced operation state S4, the main control device 31 transitions from the forced operation state S4 to the normal control state S10. The satisfaction of the forced operation release condition means that all of the following conditions E1, E2, and E3 are satisfied.

Condition E1 . . . At least any one of the conditions B1, B2, and B3 is satisfied.

Condition E2 . . . The detection result of the direction sensor 35 is different from the last value.

Condition E3 . . . The forklift truck 10 is traveling.

The condition E1 is considered to be the same condition as the starting limit release condition. The condition E2 is satisfied when, with the operation of the direction lever 17, the detection result of the direction sensor 35 changes from the forward travel to the neutral, from the forward travel to the backward travel, from the neutral to the forward travel, from the neutral to the backward travel, from the backward travel to the neutral, or from the backward travel to the forward travel. The condition E3 may be determined from the vehicle speed. The main control device 31 determines that the forklift truck 10 is traveling when the vehicle speed is higher than the stop determination threshold [km/h].

If a forced operation pre-release condition is satisfied when the main control device 31 is in the forced operation state S4, the main control device 31 transitions from the forced operation state S4 to the forced operation pre-release state S5. The satisfaction of the forced operation pre-release condition means that the following condition F1 is satisfied. It is noted that, when both of the forced operation release condition and the forced operation pre-release condition are satisfied, the main control device 31 prioritizes the forced operation release condition and transitions to the normal control state S10.

Condition F1 . . . At least one of the conditions B1, B2, and B3 is satisfied.

The forced operation pre-release condition is considered to be the same condition as the starting limit release condition.

As shown in FIG. 10, the forced operation pre-release state S5 is a state in which the vehicle speed limit is released and, on the other hand, the acceleration upper limit value is set to AS1 [m/s2], whereby a limit is imposed to acceleration. AS1 is a value greater than 0 and is a value less than the maximum acceleration that the forklift truck 10 can reach. The main control device 31 permits acceleration of the forklift truck 10 at AS1 or less. When the acceleration limit is imposed, the main control device 31 performs control such that the acceleration of the forklift truck 10 does not exceed the acceleration upper limit value. For example, the main control device 31 transmits a command for instructing the target rotational speed and a command for instructing the target acceleration to the travel control device 43. The travel control device 43 controls, from the target rotational speed and the target acceleration, the rotational speed of the travel motor 41 such that the acceleration of the forklift truck 10 reaches the target acceleration. If the acceleration upper limit value is set, the main control device 31 transmits the acceleration upper limit value to the travel control device 43 as the target acceleration. Accordingly, the main control device 31 may impose the acceleration limit to the forklift truck 10. The main control device 31 permits acceleration at the acceleration upper limit value or less and, on the other hand, limits acceleration exceeding the acceleration upper limit value. The main control device 31 functions as the speed limit unit that imposes the speed limit according to the acceleration upper limit value. In the forced operation pre-release state S5, the alarm by the alarm device 58 is not issued.

As shown in FIG. 9, if a forced operation regular release condition is satisfied when the main control device 31 is in the forced operation pre-release state S5, the main control device 31 transitions to the normal control state S10. The satisfaction of the forced operation regular release condition means that at least one of the following conditions G1 and G2 is satisfied.

Condition G1 . . . The vehicle speed of the forklift truck 10 reaches a value obtained by subtracting a first predetermined value from the target vehicle value.

Condition G2 . . . Accelerator is OFF.

The condition G1 is considered that a speed deviation, which is a difference between the target vehicle speed and the vehicle speed of the forklift truck 10, is smaller than the first predetermined value. In the forced operation pre-release state S5, since the acceleration limit is imposed, speed followability of the forklift truck 10 decreases and the vehicle speed of the forklift truck 10 less easily reaches the target vehicle speed. The first predetermined value is set in order to, in a state in which the acceleration limit is imposed, determine that the vehicle speed of the forklift truck 10 has reached the target vehicle speed intended by the operator. As the first predetermined value, for example, any value may be set from 0.5 [km/h] to 2.0 [km/h].

If a starting limit condition is satisfied when the main control device 31 is in the forced operation pre-release state S5, the main control device 31 transitions to the starting limit state S2.

The main control device 31 performs the starting limit control described above, whereby, when the forklift truck 10 is started, the speed limit is imposed as described below.

In a state in which the forklift truck 10 is stopped and when a corresponding relationship of a table shown in FIG. 12 holds, the main control device 31 is in the normal control state S10. When no object is present in the starting limit area AA1 and inside the predicted track T, the vehicle speed limit is not imposed on the forklift truck 10. Since the vehicle speed limit is not imposed by the main control device 31, the operator of the forklift truck 10 may start moving the forklift truck 10. When no object is present in the starting limit area AA1, since no object hindering the traveling of the forklift truck 10 is present, the forklift truck 10 is allowed to start traveling. In the present embodiment, the forklift truck 10 detects the object hindering the traveling of the forklift truck 10 when the forklift truck 10 is moved backward and urges a driver to avoid the object. Therefore, even in a state in which the forklift truck 10 is stopped and a state in which the object is present in the starting limit area AA1, the operator of the forklift truck 10 may start the traveling of the forklift truck 10 when the operator attempts to make the forklift truck 10 forward travel.

When the corresponding relationship of the table shown in FIG. 11 holds, that is, when the detection result of the direction sensor 35 is not the forward travel in a state in which the object is present inside the predicted track T, the main control device 31 is in the starting limit state S2 and the traveling of the forklift truck 10 is prohibited. In the case of the starting limit state S2, the operator may attempt to move the forklift truck 10 in the backward travel direction without recognizing that the object is present inside the predicted track T. Therefore, the main control device 31 prohibits the traveling of the forklift truck 10. If the operator recognizes that the object is present inside the predicted track T and changes a steering angle or changes a travel direction to the forward travel direction, whereby the object disappears in the predicted track T, the main control device 31 transitions to the normal control state S10 and the traveling of the forklift truck 10 is permitted.

If the operator attempts to move the forklift truck 10 in the backward travel direction in the starting limit state S2 and operates the accelerator pedal 16, the main control device 31 transitions to the starting prohibition state S3. When the main control device 31 transitions to the starting prohibition state S3, regarding that the operator of the forklift truck 10 does not recognize that the object is present inside the predicted track T, the main control device 31 intensifies the alarm by the alarm device 58. Thus, the main control device 31 notifies the operator of the forklift truck 10 that the object is present inside the predicted track T. In the starting limit state S2 and the starting prohibition state S3, since the vehicle speed upper limit value is set to 0, a limit value is set to prohibit the traveling of the forklift truck 10. When the main control device 31 transitions to the starting limit state S2 or the starting prohibition state S3, the main control device 31 functions as the starting prohibition control unit.

If the operation of the accelerator pedal 16 by the operator is released after the main control device 31 transitions to the starting prohibition state S3, since the operation of the accelerator pedal 16 is released, the main control device 31 determines that the operator of the forklift truck 10 has recognized that the object is present inside the predicated track T. Consequently, the main control device 31 transitions to the forced operation state S4.

In the forced operation state S4, even if the object is present in the starting limit area AA1, the traveling of the forklift truck 10 is permitted. That is, after determining that the operator of the forklift truck 10 has recognized that the object is present in the starting limit area AA1, regarding that the operator of the forklift truck 10 may move the forklift truck 10 while avoiding the object, the main control device 31 permits the traveling of the forklift truck 10. In the forced operation state S4, since the vehicle speed upper limit value is set to VS1, a limit value is set such that the traveling of the forklift truck 10 is permitted. When the main control device 31 transitions to the forced operation state S4, the main control device 31 functions as the starting permission control unit. When the main control device 31 transitions to the forced operation state S4, the main control device 31 functions as the first permission control unit.

If the object disappears from the starting limit area AA1 with movement of at least one of the forklift truck 10 and the object, the main control device 31 transitions to the forced operation pre-release state S5. The acceleration limit is imposed in the forced operation pre-release state S5. In the forced operation state S4, since the vehicle speed limit is imposed, the speed deviation may become large. Therefore, by interposing the forced operation pre-release state S5 before the transition from the forced operation state S4 to the normal control state S10, the forklift truck 10 is gently accelerated. In the forced operation state S4, if the detection result of the direction sensor 35 becomes a value different from the last value with the operation of the direction lever 17 by the operator, the main control device 31 transitions to the normal control state S10. In the forced operation pre-release state S5, since the acceleration upper limit value is set to AS1, a limit value is set such that the traveling of the forklift truck 10 is permitted. Since the forced operation pre-release state S5 is a state to which the main control device 31 transitions via the forced operation state S4, when the main control device 31 transitions to the forced operation pre-release state S5, the operator of the forklift truck 10 is considered to recognize the presence of the object. When the main control device 31 transitions to the forced operation pre-release state S5, the main control device 31 functions as the starting permission control unit. When the main control device 31 transitions to the forced operation pre-release state S5, the main control device 31 functions as the second permission control unit.

If the forklift truck 10 accelerates and the speed deviation decreases in the forced operation pre-release state S5, the main control device 31 transitions to the normal control state S10. In the forced operation pre-release state S5, since the acceleration limit is imposed, efficient acceleration cannot be achieved. When the efficient acceleration is desired, releasing the forced operation pre-release state S5 is allowed with the accelerator OFF for improvement of workability. When the starting limit condition is satisfied again before the main control device 31 transitions from the forced operation pre-release state S5 to the normal control state S10, the main control device 31 transitions to the starting limit state S2.

As described above, the starting limit control functions when the forklift truck 10 is about to start traveling from the state in which the forklift truck 10 is stopped. In the starting limit control, in the state in which the forklift truck 10 is stopped, when the object is present in the starting limit area AA1 and inside the predicted track T, the traveling of the forklift truck 10 is restricted by setting the vehicle speed upper limit value to 0. Since the speed limit is imposed when the travel direction of the forklift truck 10 is a direction approaching the object, the forklift truck 10 is considered to be prevented from approaching the object.

Next, the automatic deceleration control will be described.

The automatic deceleration control includes a travel limit control for stopping the forklift truck 10 and a vehicle speed limit control for permitting traveling of the forklift truck 10 at the vehicle speed upper limit value or less. First, the travel limit control will be described.

Figure 13:
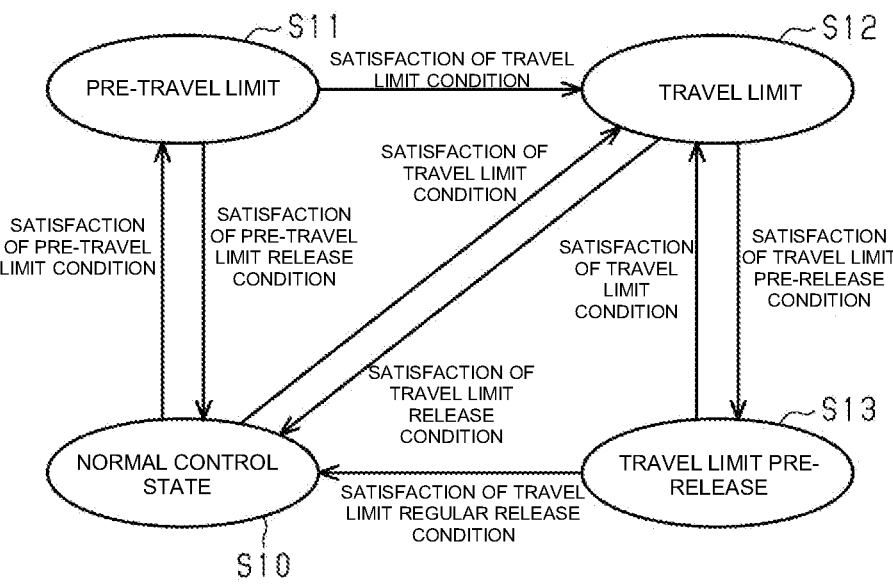
FIG. 13 is a state transition diagram of travel limit control.

As shown in FIG. 13, in the travel limit control, by setting a state of the main control device 31 to any one of the normal control state S10, a pre-travel limit state S11, a travel limit state S12, and a travel limit pre-release state S13, controls corresponding to the respective states are performed.

The normal control state S10 is the same state as the normal control state S10 in the starting limit control.

If a pre-travel limit condition is satisfied when the main control device 31 is in the normal control state S1, the main control device 31 transitions to the pre-travel limit state S11. The satisfaction of the pre-travel limit condition means that both of the following conditions H1 and H2 are satisfied.

Condition H1 . . . A person is present in an alarm area.

Condition H2 . . . The forklift truck 10 is traveling in the backward travel direction.

The alarm area is an area different from an area in which the vehicle speed limit is imposed in the automatic deceleration area AA2. The alarm area is an area that is set such that the alarm by the alarm device 58 may be issued before the person enters the predicted track T. The alarm area of the condition H1 may be the entire automatic deceleration area AA2 excluding the predicted track T or may be an area in a predetermined range expanding from the predicted track T to the outside of the predicted track T.

It is possible to determine, from vehicle speed and a travel direction calculated by the main control device 31, whether the forklift truck 10 is traveling in the backward travel direction. The main control device 31 determines that the forklift truck 10 is traveling in the backward travel direction when the travel direction of the forklift truck 10 is the backward travel direction and the vehicle speed is higher than the stop determination threshold.

The pre-travel limit state S11 is a state in which the alarm by the alarm device 58 is issued. In the pre-travel limit state S11, the vehicle speed limit, the acceleration limit, and the deceleration limit are not imposed. It is noted that the alarm in the pre-travel limit state S11 is not issued at a switchback time of the forklift truck 10. The switchback is an operation for switching the forward travel to the backward travel or switching the backward travel to the forward travel with the operation of the direction lever 17. If the detection result of the direction sensor 35 and the travel direction of the forklift truck 10 do not coincide, the main control device 31 turns on a switchback flag. The main control device 31 does not issue the alarm by the alarm device 58 even if the main control device 31 transitions to the pre-travel limit state S11 in a state in which the switchback flag is on. The switchback flag is released, for example, when the main control device 31 transitions from the pre-travel limit state S11 to another state.

If a pre-travel limit release condition is satisfied when the main control device 31 is in the pre-travel limit state S11, the main control device 31 transitions to the normal control state S10. The satisfaction of the pre-travel limit release condition means that at least one of the following conditions I1 and I2 is satisfied.

Condition I1 . . . No person is present inside the predicted track T and the alarm area.

Condition I2 . . . Traveling in the backward travel direction is stopped, and the backward travel operation is not performed.

The traveling in the backward travel direction being stopped means that the vehicle speed of the forklift truck 10 changes from a state in which the vehicle speed is higher than the stop determination threshold to a state in which the vehicle speed is at the stop determination threshold or less. That is, the traveling forklift truck 10 is stopped. A state in which the backward travel operation is not performed is a state in which at least one of a state in which the accelerator opening degree is 0%, that is, the accelerator pedal 16 is not operated and a state in which the detection result of the direction sensor 35 is not the backward travel holds. The state in which the detection result of the direction sensor 35 is not the backward travel is a state in which the detection result of the direction sensor 35 is the neutral or the forward travel.

If a travel limit condition is satisfied when the main control device 31 is in the pre-travel limit state S11, the main control device 31 transitions to the travel limit state S12. The satisfaction of the travel limit condition means that all of the following conditions J1 and J2 are satisfied.

Condition J1 . . . A person is present inside the predicted track T.

Condition J2 . . . The forklift truck 10 is traveling in the backward travel direction.

It is possible to determine whether the condition J1 is satisfied from an X coordinate and a Y coordinate of a person. Since the predicted track T is specified by an X coordinate and a Y coordinate, it is possible to determine whether the person is present inside the predicted track T from the X coordinate and the Y coordinate of the person. Since the predicted track T is derived in the automatic deceleration area AA2, when the person is present inside the predicted track T, the person is considered to be present in the automatic deceleration area AA2 and inside the predicted track T. The condition J2 is the same condition as the condition H2.

As shown in FIG. 10, the travel limit state S12 is a state in which the vehicle speed upper limit value is set to 0 to decelerate and stop the traveling forklift truck 10. In the travel limit state S12 of the present embodiment, the deceleration limit is imposed. In the travel limit state S12, a deceleration upper limit value is set to DS1 [m/s2]. DS1 is a value larger than 0 and is a value lower than the maximum deceleration of the forklift truck 10. The main control device 31 permits deceleration of the forklift truck 10 at DS1 or less. When the deceleration limit is imposed, the main control device 31 performs a control such that the deceleration of the forklift truck 10 does not exceed the deceleration upper limit value. For example, the main control device 31 transmits a command for instructing the target rotational speed and a command for instructing the target deceleration to the travel control device 43. The travel control device 43 controls, based on the target rotational speed and the target deceleration, the travel motor 41 such that the deceleration of the forklift truck 10 reaches the target deceleration. When the deceleration upper limit value is set, the main control device 31 transmits the deceleration upper limit value to the travel control device 43 as the target deceleration. Consequently, the main control device 31 may impose the deceleration limit on the forklift truck 10. In the travel limit state S12, the alarm by the alarm device 58 is issued. It is noted that, when deceleration operation by the operator is performed, the main control device 31 prioritizes the deceleration operation by the operator and does not impose a limit for the deceleration. Examples of the deceleration operation include the accelerator OFF, the operation of the direction lever 17 to the neutral position, brake operation, and the switchback operation.

As illustrated in FIG. 13, if a travel limit release condition is satisfied when the main control device 31 is in the travel limit state S12, the main control device 31 transitions to the normal control state S10. The satisfaction of the travel limit release condition means that the following condition K1 is satisfied.

Condition K1 . . . Traveling in the backward travel direction is stopped, and the backward travel operation is not performed.

The condition K1 is the same condition as the condition I2.

If a travel limit pre-release condition is satisfied when the main control device 31 is in the travel limit state S12, the main control device 31 transitions to the travel limit pre-release state S13. The satisfaction of the travel limit pre-release condition means that all of the following conditions L1 and L2 are satisfied.

Condition L1 . . . No person is present inside the predicted track T.

Condition L2 . . . The forklift truck 10 is traveling in the backward travel direction.

The condition L1 is considered to be satisfied when the condition J1 is not satisfied. The condition L2 is the same condition as the condition H2.

As shown in FIG. 10, the travel limit pre-release state S13 is a state in which the vehicle speed limit is released and, on the other hand, the acceleration limit is imposed. The main control device 31 sets an acceleration upper limit value to AS2 [m/s2] and performs control such that the acceleration of the forklift truck 10 does not exceed AS2. AS2 is a value larger than 0 and is a value lower than the maximum acceleration that the forklift truck 10 can reach. AS2 may be the same value as the AS1 or may be a value different from AS1. In the travel limit pre-release state S13, the alarm by the alarm device 58 is not issued.

As illustrated in FIG. 13, if a travel limit regular release condition is satisfied when the main control device 31 is in the travel limit pre-release state S13, the main control device 31 transitions to the normal control state S10. The satisfaction of the travel limit regular release condition means that at least one of the following conditions M1 and M2 is satisfied.

Condition M1 . . . The vehicle speed of the forklift truck 10 reaches a value obtained by subtracting a second predetermined value from the target vehicle speed.

Condition M2 . . . The backward travel operation is not performed.

The condition M1 is considered to be that the speed deviation, which is the difference between the target vehicle speed and the vehicle speed of the forklift truck 10, is smaller than the second predetermined value. In the travel limit pre-release state S13, since the acceleration limit is imposed, the speed followability of the forklift truck 10 decreases and the vehicle speed of the forklift truck 10 less easily reaches the target vehicle speed. The second predetermined value is set in order to determine that the vehicle speed of the forklift truck 10 has reaches the target vehicle speed intended by the operator in a state in which the acceleration limit is imposed. As the second predetermined value, for example, any value may be set from 0.5 [km/h] to 2.0 [km/h]. The second predetermined value may be the same value as the first predetermined value or may be a value different from the first predetermined value.

If a travel limit condition is satisfied when the main control device 31 is in the travel limit pre-release state S13, the main control device 31 transitions to the travel limit state S12. Similarly, if the travel limit condition is satisfied when the main control device 31 is in the normal control state S10, the main control device 31 transitions to the travel limit state S12.

It is noted that, as described above, the main control device 31 further extends the predicted track T in the travel direction as the vehicle speed of the forklift truck 10 is higher. If the main control device 31 transitions to the travel limit state S12 and further reduces the predicted track T in the travel direction as the vehicle speed of the forklift truck 10 decreases, a person is likely to be on the outside the predicted track T. Then, even if the forklift truck 10 and the person are approaching, the main control device 31 alternately transitions to the travel limit state S12 and the travel limit pre-release state S13. To prevent this problem, when detecting a person present inside the predicted track T, the main control device 31 maintains the length of the predicted track T in the travel direction, that is, the track derivation threshold YT irrespective of the vehicle speed of the forklift truck 10. The maintenance of the track derivation threshold YT is released, for example, at an instance when the person disappears in the predicted track T.

The main control device 31 performs the travel limit control as described above, whereby the speed limit is imposed as described below during the traveling of the forklift truck 10.

If a person enters the alarm area during the traveling of the forklift truck 10, the main control device 31 transitions to the pre-travel limit state S11. The main control device 31 issues the alarm by the alarm device 58 to cause the operator to recognize that the person is likely to enter the predicted track T. If the operator turns the forklift truck 10 in a direction away from the person or stops the forklift truck 10 so as not to perform the backward travel operation, the main control device 31 transitions to the normal control state S10. If the person enters the predicted track T in a state in which the main control device 31 transitions to the pre-travel limit state S11, the main control device 31 transitions to the travel limit state S12. The main control device 31 sets the vehicle speed upper limit value to 0 and the forklift truck 10 stops. At this time, since the deceleration upper limit value DS1 is set, a limit is imposed on the deceleration, thereby stopping the forklift truck 10 gently.

After the main control device 31 transitions to the travel limit state S12, the forklift truck 10 stops and, when the backward travel operation by the operator is not performed, the main control device 31 transitions to the normal control state S10. If a travel limit condition is satisfied when the main control device 31 is in the normal control state S10, the main control device 31 transitions to the travel limit state S12 not via the pre-travel limit state S11. As a situation in which the travel limit condition is satisfied while the pre-travel limit condition is not satisfied, for example, a case in which the speed of the forklift truck 10 is high or a situation in which an object intrudes into the predicted track T from a blind spot of an object detectable range by the object detection unit 51 is assumed.

When the main control device 31 is in the travel limit state S12, if a person disappears in the predicted track T before the forklift truck 10 stops, the main control device 31 transitions to the travel limit pre-release state S13. In addition, if the person enters the predicted track T again after transitioning to the travel limit pre-release state S13, the main control device 31 transitions to the travel limit state S12. In the travel limit pre-release state S13, a limit is imposed on the acceleration. In the travel limit state S12, since the vehicle speed limit is imposed, the speed deviation may be large. Therefore, the forklift truck 10 is gently accelerated by interposing the travel limit pre-release state S13 before the main control device 31 transitions from the travel limit state S12 to the normal control state S10.

If the forklift truck 10 accelerates and the speed deviation decreases in the travel limit pre-release state S13, the main control device 31 transitions to the normal control state S10. In the travel limit pre-release state S13, since a limit is imposed on the acceleration, efficient acceleration cannot be achieved. When it is desired to achieve efficient acceleration, release of the travel limit pre-release state S13 is allowed with accelerator OFF for improvement of workability.

As described above, if a person is detected by the object detection unit 51 and the person enters the predicted track T, the travel limit control functions, thereby stopping the forklift truck 10. It can be said that the speed limit is imposed when the travel direction of the forklift truck 10 is a direction in which the forklift truck 10 approaches the person.

Next, vehicle speed limit control will be described. As the vehicle speed limit control, different controls are performed for when an object is a person and when the object is an obstacle. A state transition diagram is the same when the object is the person and when the object is the obstacle. Vehicle speed limit controls performed when the object is the person and when the object is the obstacle are described with reference to FIG. 14. First, the vehicle speed limit control performed when the object is the person will be described.

Figure 14:
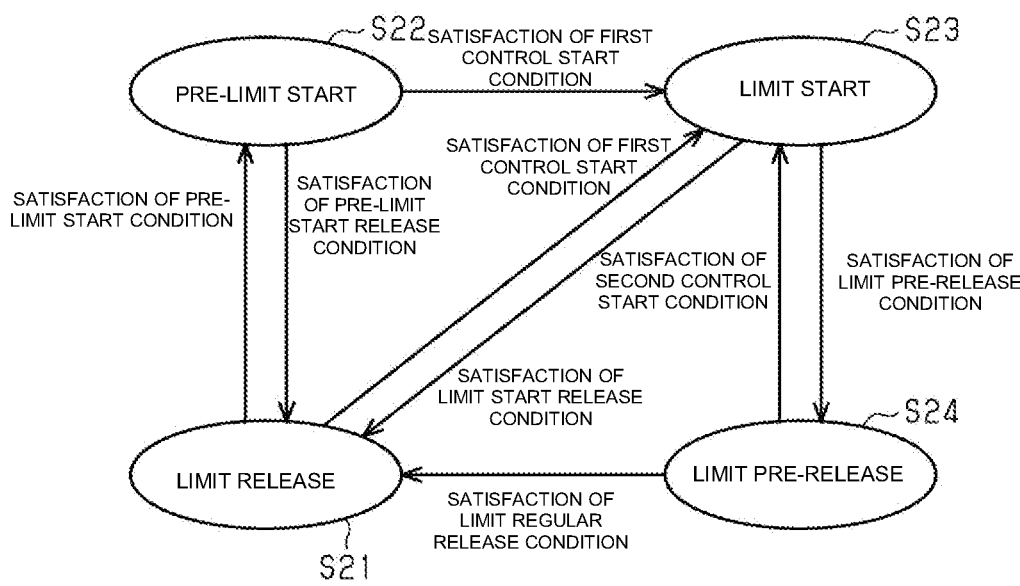
FIG. 14 is a state transition diagram of vehicle speed limit control.

As shown in FIG. 14, in the vehicle speed limit control, by setting the state of the main control device 31 to any one of a limit release state S21, a pre-limit start state S22, a limit start state S23, and a limit pre-release state S24, controls corresponding to the respective states are performed.

As shown in FIG. 10, the limit release state S21 is a state in which the vehicle speed limit is not imposed. In addition, in the limit release state S21, a limit is not imposed on acceleration and deceleration.

As shown in FIG. 14, if a pre-limit start condition is satisfied when the main control device 31 is in the limit release state S21, the main control device 31 transitions to the pre-limit start state S22. The satisfaction of the pre-limit start condition means that all of the following conditions N1 and N2 are satisfied.

Condition N1 . . . A person is present in a prior alarm area in the automatic deceleration area AA2.

Condition N2 . . . The forklift truck 10 is traveling in the backward travel direction.

The prior alarm area is an area positioned farther than a vehicle speed limit area where the vehicle speed limit is imposed. The vehicle speed limit area is an area where the vehicle speed limit is imposed in the automatic deceleration area AA2 and in an area outside the predicted track T. The vehicle speed limit may not be imposed in a position distant from the forklift truck 10 in the automatic deceleration area AA2. That is, in the automatic deceleration area AA2, both of the vehicle speed limit area where the vehicle speed limit is imposed and an area that is farther away from the forklift truck 10 than the vehicle speed limit area is and where the vehicle speed limit is not imposed can be present. The vehicle speed limit area is a region expanding from the predicted track T behind of the predicted track T and the left and the right of the predicted track T. The vehicle speed limit area is determined based on the vehicle speed of the forklift truck 10 and the predicted track T. The prior alarm area is an area where a vehicle speed upper limit value higher than the vehicle speed of the forklift truck 10 is set. The prior alarm area is derived from the vehicle speed of the forklift truck 10 and a vehicle speed upper limit value set according to the position of the person and is derived such that a time from when a person enters the prior alarm area until when the person enters the vehicle speed limit area is a predetermined setting time. The predetermined setting time is, for example, one second to three seconds.

The pre-limit start state S22 is a state in which the alarm by the alarm device 58 is issued. The pre-limit start state S22 is considered to be a state for alarming, to the operator, likelihood that the vehicle speed limit is imposed before the vehicle speed limit is imposed. In the pre-limit start state S22, the vehicle speed limit, the acceleration limit, and the deceleration limit are not imposed. In the pre-limit start state S22, as in the case of the pre-travel limit state S11, the alarm is not issued at the switchback time of the forklift truck 10.

If a pre-limit start release condition is satisfied when the main control device 31 is in the pre-limit start state S22, the main control device 31 transitions to the limit release state S21. The satisfaction of the pre-limit start release condition means that at least one of the following conditions O1 and O2 is satisfied.

Condition O1 . . . No person is present in the vehicle speed limit area and the prior alarm area.

Condition O2 . . . Traveling in the backward travel direction is stopped, and the backward travel operation is not performed.

If a first limit start condition is satisfied when the main control device 31 is in the pre-limit start state S22, the main control device 31 transitions to the limit start state S23. The satisfaction of the first limit start condition means that all of the following conditions P1 and P2 are satisfied.

Condition P1 . . . A person is present in the vehicle speed limit area in the automatic deceleration area AA2.

Condition P2 . . . The forklift truck 10 is traveling in the backward travel direction.

As shown in FIG. 10, the limit start state S23 is a state in which the vehicle speed limit is imposed on the forklift truck 10 because a person is present in the vehicle speed limit area in the automatic deceleration area AA2. The vehicle speed upper limit value is set to a lower value as the distance from the forklift truck 10 to the person is shorter. A map in which the vehicle speed upper limit value is associated with the distance from the forklift truck 10 to a person is stored in the storage unit 33 of the main control device 31 or a storage medium such as an external storage device. The main control device 31 sets a map value, which is the vehicle speed upper limit value corresponding to the map, as the vehicle speed upper limit value. It is noted that the vehicle speed upper limit value is not limited to a mode in which the vehicle speed upper limit value decreases in proportion to a decrease in the distance from the forklift truck 10 to a person. The vehicle speed upper limit value only has to have a correlation in which the vehicle speed upper limit value decreases when the distance from the forklift truck 10 to a person decreases. When a plurality of persons are present in the vehicle speed limit area in the automatic deceleration area AA2, the vehicle speed upper limit value is decided by the position of a person closest to the forklift truck 10.

In the limit start state S23, the deceleration limit is imposed. In the limit start state S23, the deceleration upper limit value is set to DS2 [m/s2]. DS2 is a value larger than 0 and lower than the maximum deceleration of the forklift truck 10. DS2 may be the same value as DS1 or may be a value different from DS1. It is noted that, as in the case of the travel limit state S12, when the deceleration operation is performed by the operator, the main control device 31 may prioritize the deceleration operation by the operator and may not apply the limit of the deceleration.

As shown in FIG. 14, if a limit start release condition is satisfied when the main control device 31 is in the limit start state S23, the main control device 31 transitions to the limit release state S21. The satisfaction of the limit start release condition means that the following condition Q1 is satisfied. If the first limit start condition is satisfied when the main control device 31 is in the limit release state S21, the main control device 31 transitions to the limit start state S23.

Condition Q1 . . . Traveling in the backward travel direction is stopped, and the backward travel operation is not performed.

If a limit pre-release condition is satisfied when the main control device 31 is in the limit start state S23, the main control device 31 transitions to the limit pre-release state S24. The satisfaction of the limit pre-release condition means that the following condition R1 is satisfied.

Condition R1 . . . No person is present in the vehicle speed limit area in the automatic deceleration area AA2.

As shown in FIG. 10, the limit pre-release state S24 is a state in which the vehicle speed limit is released and, on the other hand, the acceleration limit is imposed because the acceleration upper limit value is set to AS3 [m/s2]. AS3 is a value larger than 0 and is lower than the maximum acceleration that the forklift truck 10 can reach. The main control device 31 permits acceleration of the forklift truck 10 at AS3 or less. AS3 may be the same value as AS1 and AS2 or may be a value different from AS1 and AS2.

As shown in FIG. 14, if a second limit start condition is satisfied when the main control device 31 is in the limit pre-release state S24, the main control device 31 transitions to the limit start state S23. The satisfaction of the second limit start state means that the following condition S1 is satisfied.

Condition S1 . . . A person is present in the vehicle speed limit area in the automatic deceleration area AA2.

If a limit regular release condition is satisfied when the main control device 31 is in the limit pre-release state S24, the main control device 31 transitions to the limit release state S21. The satisfaction of the limit regular release condition means that at least one of the following conditions T1 and T2 is satisfied.

Condition T1 . . . The vehicle speed of the forklift truck 10 reaches a value obtained by subtracting a third predetermined value from the target vehicle speed.

Condition T2 . . . The backward travel operation is not performed.

The condition T1 is considered to be that the speed deviation, which is the difference between the target vehicle speed and the vehicle speed of the forklift truck 10, is smaller than the third predetermined value. In the limit pre-release state S24, since the acceleration limit is imposed, the speed followability of the forklift truck 10 decreases, and the vehicle speed of the forklift truck 10 less easily reaches the target vehicle speed. The third predetermined value is set in order to determine that, in a state in which the acceleration limit is imposed, the vehicle speed of the forklift truck 10 has reached the target vehicle speed intended by the operator. As the third predetermined value, for example, any value may be set from 0.5 [km/h] to 2.0 [km/h]. The third predetermined value may be the same value as the first predetermined value and the second predetermined value or may be a value different from the first predetermined value and the second predetermined value.

It is noted that, as in the case of the travel limit control, when detecting a person present in the vehicle speed limit area, the main control device 31 may maintain the track derivation threshold YT.

The main control device 31 performs the vehicle speed limit control for the person as described above, whereby the following speed limit is imposed during the traveling of the forklift truck 10.

If a person enters the prior alarm area during the traveling of the forklift truck 10, the main control device 31 transitions to the pre-limit start state S22. The main control device 31 issues the alarm by the alarm device 58 to cause the operator to recognize that the person is likely to enter the predicted track T. If the operator turns the forklift truck 10 in a direction in which the forklift truck 10 moves away from the person or stop the forklift truck 10 not to perform the backward travel operation, the main control device 31 transitions to the limit release state S21. If the person enters the vehicle speed limit area in a state in which the main control device 31 transitions to the pre-limit start state S22, the main control device 31 transitions to the limit start state S23. The main control device 31 sets the vehicle speed upper limit value to a value corresponding to the map. At this time, since the deceleration upper limit value DS2 is set, a limit is imposed on the deceleration as well. Therefore, the forklift truck 10 gently decelerates.

In the limit start state S23, although the vehicle speed upper limit value is set, traveling of the forklift truck 10 at the vehicle speed upper limit value or less is permitted. The operator is capable of traveling the forklift truck 10 while avoiding the person. If a limit start release condition is satisfied when the main control device 31 is in the limit start state S23, the main control device 31 transitions to the limit release state S21 to release the vehicle speed limit.

If the operator continues the traveling of the forklift truck 10 in the limit start state S23 and the person disappears from the vehicle speed limit area, the main control device 31 transitions to the limit pre-release state S24. Consequently, the vehicle speed limit is released. A limit is imposed on the acceleration in the limit pre-release state S24. In the limit start state S23, since the vehicle speed limit is imposed, the speed deviation may increase. Therefore, the forklift truck 10 is gently accelerated by interposing the limit pre-release state S24 before the main control device 31 transitions from the limit start state S23 to the limit release state S21.

If the forklift truck 10 accelerates in the limit pre-release state S24 and the speed deviation decreases, the main control device 31 transitions to the limit release state S21. In the limit pre-release state S24, since the limit is imposed on the acceleration, efficient acceleration cannot be achieved. When it is desired to achieve efficient acceleration, release of the limit pre-release state S24 is allowed with accelerator OFF for improvement of workability. If the operator changes the travel direction to the forward travel direction during the limit pre-release state S24, the main control device 31 transitions to the limit release state S21. When the person enters the vehicle speed limit area again before the main control device 31 transitions from the limit pre-release state S24 to the limit release state S21, the main control device 31 transitions to the limit start state S23.

As described above, if a person is detected by the object detection unit 51 in the state in which the forklift truck 10 is traveling, the vehicle speed limit control for the person functions in the automatic deceleration area AA2 and outside the predicted track T, whereby the forklift truck 10 is decelerated.

Next, the vehicle speed limit control in the case in which an object is an obstacle will be described. In the following description, differences from the vehicle speed limit control performed when the object is a person will be described, and the description of vehicle speed limit control similar to the vehicle speed limit control when the object is the person will be omitted.

The satisfaction of the pre-limit start condition in the case in which the object is the obstacle means that both of the following conditions U1 and U2 are satisfied.

Condition U1 . . . An obstacle is present in the prior alarm area in the automatic deceleration area AA2.

Condition U2 . . . The forklift truck 10 is traveling in the backward travel direction.

A vehicle speed limit area in the case in which the object is an obstacle is an area in the predicted track T in the automatic deceleration area AA2. The case in which the object is the obstacle is different from the case in which the object is the person in that the vehicle speed limit area is set in the predicted track T. The prior alarm area is an area farther than the vehicle speed limit area. The prior alarm area is derived from the vehicle speed of the forklift truck 10 and a vehicle speed upper limit value set according to the position of the obstacle, and is derived such that a time from when the obstacle enters the prior alarm area until when the obstacle enters the vehicle speed limit area is a predetermined setting time. The predetermined setting time is, for example, one second to three seconds. When the object is the obstacle, the prior alarm area is any one of an area farther than the vehicle speed limit area in the predicted track T, an area on an extended line of the predicted track T outside the predicted track T, and an area including both of these areas.

The pre-limit start release condition, the first limit start condition, the limit start release condition, the limit pre-release condition, the second limit start condition, and the limit regular release condition are conditions in which the person is changed to the obstacle.

It is noted that the vehicle speed upper limit value imposed on the forklift truck 10 in the case in which the object is the obstacle is set to a lower value as the distance from the forklift truck 10 to the obstacle is shorter. A map in which the vehicle speed upper limit value is associated with the distance from the forklift truck 10 to the obstacle is stored in the storage unit 33 of the main control device 31 or a storage medium such as an external storage device. The main control device 31 sets the vehicle speed upper limit value from the map. It is noted that the vehicle speed upper limit value is not limited to a mode in which the vehicle speed upper limit value decreases in proportion to a decrease in the distance from the forklift truck 10 to the obstacle. There only has to be a correlation in which the vehicle speed upper limit value decreases as the distance from the forklift truck 10 to the obstacle decreases. The vehicle speed upper limit value imposed when the object is the obstacle is higher than the vehicle speed upper limit value in the case in which the object is the person. Specifically, if the distance from the forklift truck 10 is the same, the vehicle speed upper limit value is set to a higher value when the object is the obstacle compared with when the object is the person.

The main control device 31 performs the vehicle speed limit control for the obstacle as described above, whereby the speed limit is imposed as described below during the traveling of the forklift truck 10.

If an obstacle enters the prior alarm area during the traveling of the forklift truck 10, the main control device 31 transitions to the pre-limit start state S22. The main control device 31 issues the alarm by the alarm device 58 to cause the operator to recognize that the obstacle is present nearby. If the operator turns the forklift truck 10 in a direction in which the forklift truck 10 moves away from the obstacle or stops the forklift truck 10 not to perform the backward travel operation, the main control device 31 transitions to the limit release state S21. If the obstacle enters the vehicle speed limit area in a state in which the main control device 31 transitions to the pre-limit start state S22, the main control device 31 transitions to the limit start state S23. The main control device 31 sets the vehicle speed upper limit value to a value corresponding to the map. At this time, since the deceleration upper limit value DS2 is set, a limit is imposed on the deceleration as well. Therefore, the forklift truck 10 gently decelerates.

In the limit start state S23, although the vehicle speed upper limit value is set, the traveling of the forklift truck 10 at the vehicle speed upper limit value or less is permitted. The operator is capable of causing the forklift truck 10 to travel while avoiding the obstacle. If a limit start release condition is satisfied when the main control device 31 is in the limit start state S23, the main control device 31 transitions to the limit release state S21 to release the vehicle speed limit. When the object is the obstacle, since the vehicle speed limit area is set in the predicted track T, the limit start release condition may be more easily satisfied than when the object is the person.

As described above, if the obstacle is detected by the object detection unit 51 in the state in which the forklift truck 10 is traveling, since the vehicle speed limit control for the obstacle functions, the vehicle speed limit is imposed when the obstacle enters the automatic deceleration area AA2 and the predicted track T. On the other hand, when the obstacle is present outside the predicted track T, the vehicle speed limit is not imposed.

In the automatic deceleration control, when a person is present inside the predicted track T, the vehicle speed upper limit value is set to 0. On the other hand, when an obstacle is present inside the predicted track T, the vehicle speed upper limit value is set to a value higher than 0. When a person is present outside the predicted track T, the vehicle speed upper limit value is set to a value higher than 0. On the other hand, when an obstacle is present outside the predicted track T, the vehicle speed limit is not imposed. Therefore, it can be said that, when the object is determined as a person, the main control device 31 sets the vehicle speed upper limit value lower than when the object is determined as an obstacle. It can be said that, when the object is present in the automatic deceleration area AA2 and inside the predicted track T, the main control device 31 sets the vehicle speed upper limit value lower than when the object is present in the automatic deceleration area AA2 and outside the predicted track T. It is noted that "setting the vehicle speed upper limit value lower" includes a mode in which the vehicle speed upper limit value is set for a state in which the vehicle speed upper limit value is not set. Without being limited to the mode in which the vehicle speed limit is imposed regardless of whether the object is present inside the predicted track T or the object is present outside the predicted track T, the vehicle speed limit may not be imposed when the object is present outside the predicted track T as in the present embodiment.

In the present embodiment, the starting limit control, the travel limit control, the vehicle speed limit control for the person, and the vehicle speed limit control for the obstacle are performed in parallel.

The starting limit control is a control for imposing the speed limit when the forklift truck 10 starts traveling from a state in which the forklift truck 10 is stopped. When the forklift truck 10 is traveling, the transition from the normal control state S10 to the starting limit state S2 is suppressed by the condition A3. If the main control device 31 transitions to the forced operation state S4 upon the satisfaction of the forced operation condition, the traveling of the forklift truck 10 at the vehicle speed upper limit VS1 or less is permitted. If the main control device 31 transitions to the forced operation pre-release state S5 upon the satisfaction of the forced operation pre-release condition, the traveling of the forklift truck 10 at the acceleration upper limit value AS1 or less is permitted. In this way, the speed limit by the starting limit control is imposed in a first vehicle speed range in which the vehicle speed in the state in which the forklift truck 10 is stopped, i.e., the vehicle speed 0, is set as a lower limit value. An upper limit value of the first vehicle speed range can change according to the vehicle speed in the forced operation pre-release state S5. The main control device 31 performing the starting limit control functions as the first control unit.

The travel limit control is a control for stopping the forklift truck 10 from the state in which the forklift truck 10 is traveling. When the forklift truck 10 is stopped, the condition J2 of the travel limit condition is not satisfied and the main control device 31 is prevented from transitioning to the travel limit state S12. The speed limit by the travel limit control is imposed in a second vehicle speed range in which vehicle speed at which the forklift truck 10 is determined as traveling, that is, the vehicle speed higher than the stop determination threshold is set as a lower limit value. It can be said that the lower limit value of the second vehicle speed range is higher than the lower limit value of the first vehicle speed range. Since the speed limit by the travel limit control is imposed when the forklift truck 10 is traveling, an upper limit value of the second vehicle speed range is absent. However, a maximum speed that the forklift truck 10 can reach practically corresponds to the upper limit value of the second vehicle speed range.

The vehicle speed limit control for the person and the vehicle speed limit control for the obstacle are controls for decelerating the forklift truck 10 from the state in which the forklift truck 10 is traveling. When the forklift truck 10 is stopped, the condition P2 of the first limit start condition is not satisfied and the main control device 31 is prevented from transitioning to the limit start state S23. As in the travel limit control, the speed limit by the vehicle speed limit control for the person and the vehicle speed limit control for the obstacle are imposed when the vehicle speed of the forklift truck 10 is in the second vehicle speed range. The main control device 31 performing the travel limit control, the vehicle speed limit control for the person, and the vehicle speed limit control for the obstacle functions as the second control unit.

As described above, the starting limit control, the travel limit control, the vehicle speed limit control for the person, and the vehicle speed limit control for the obstacle are performed in parallel. Therefore, different vehicle speed upper limit values and acceleration upper limit values can be set in the respective controls. When the different vehicle speed upper limit values are set in the respective controls, the main control device 31 selects the lowest vehicle speed upper limit value and imposes the speed limit with such a vehicle speed upper limit value. That is, when the different vehicle speed upper limit values are set in the respective controls, the main control device 31 performs a control such that the vehicle speed of the forklift truck 10 does not exceed the lowest vehicle speed upper limit value. When the different acceleration upper limit values are set in the respective controls, the main control device 31 selects the lowest acceleration upper limit value and imposes the speed limit with the acceleration upper limit value. It is noted that, when the vehicle speed upper limit value is set only in one of the starting limit control and the automatic deceleration control, the main control device 31 imposes the speed limit with the vehicle speed upper limit value. Similarly, when the acceleration upper limit value is set only in one of the starting limit control and the automatic deceleration control, the main control device 31 imposes the speed limit with the acceleration upper limit value. Selection of a limit value includes a mode in which, when a limit value is set in one of the starting limit control and the automatic deceleration control, and a limit value is not set in the other, the set limit value is selected and the speed limit is imposed with the limit value.

The main control device 31 repeatedly performs an intervention control described below at a predetermined control period. The intervention control is control for performing intervention in the automatic deceleration control to forcibly cause a state of the automatic deceleration control to transition.

Figure 15:
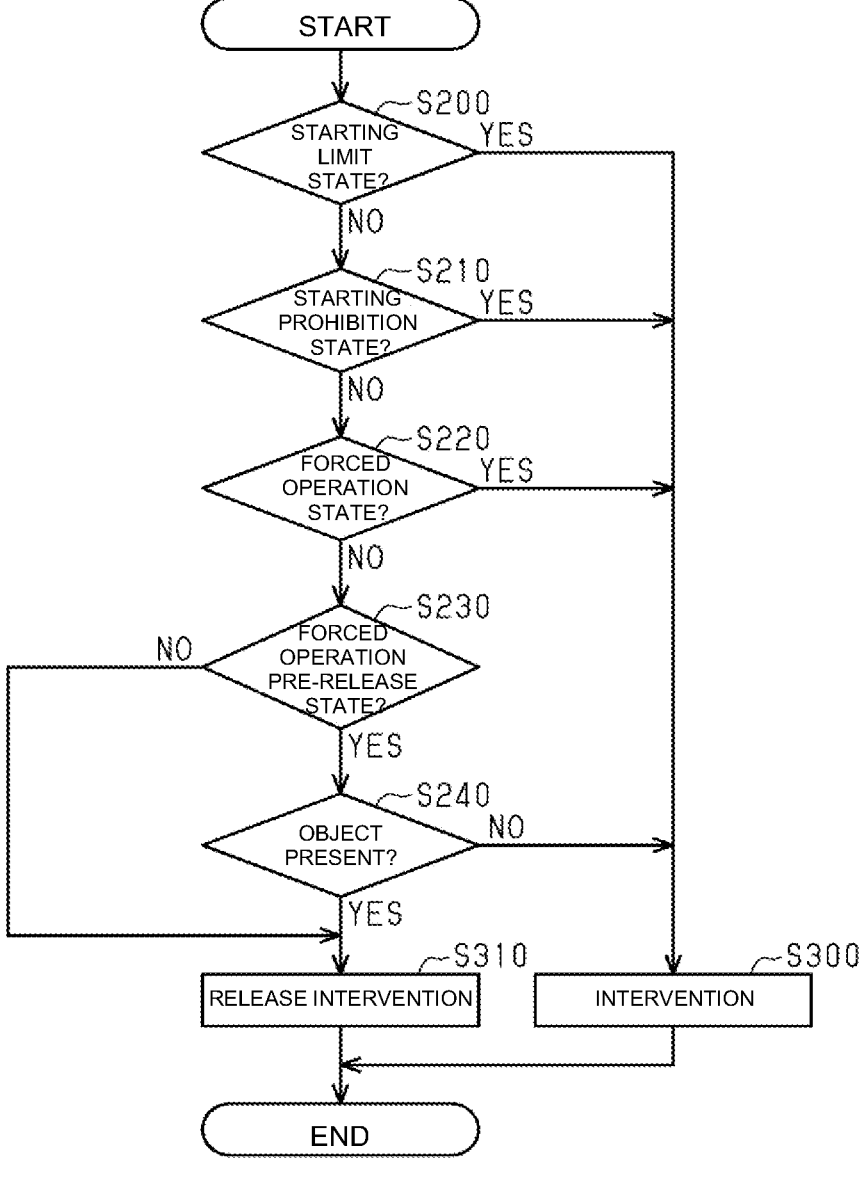
FIG. 15 is a flowchart showing processing performed by the main control device.

As shown in FIG. 15, at Step S200, the main control device 31 determines whether or not a state of the starting limit control is the starting limit state S2. When a determination result at Step S200 is affirmative, the main control device 31 performs processing at Step S300. When the determination result at Step S200 is negative, the main control device 31 performs processing at Step S210.

At Step S210, the main control device 31 determines whether or not the state of the starting limit control is the starting prohibition state S3. When a determination result at Step S210 is affirmative, the main control device 31 performs the processing at Step S300. When the determination result at Step S210 is negative, the main control device 31 performs processing at Step S220.

At Step S220, the main control device 31 determines whether or not the state of the starting limit control is the forced operation state S4. When a determination result at Step S220 is affirmative, the main control device 31 performs the processing at Step S300. When the determination result at Step S220 is negative, the main control device 31 performs processing at Step S230.

At Step S230, the main control device 31 determines whether or not the state of the starting limit control is the forced operation pre-release state S5. When a determination result at Step S230 is affirmative, the main control device 31 performs processing at Step S240. When the determination result at Step S230 is negative, the main control device 31 performs processing at Step S310.

At Step S240, the main control device 31 determines whether or not an object is present inside the predicted track T. Specifically, the main control device 31 determines whether or not the detection result of the direction sensor 35 is the backward travel and the region N, NL, or NR where the object is present, and the direction of the predicted track T coincide. When a determination result at Step S240 is negative, that is, when no object is present inside the predicted track T, the main control device 31 performs the processing at Step S300. When the determination result at Step S240 is affirmative, that is, when the object is present inside the predicted track T, the main control device 31 performs the processing at Step S310.

At Step S300, the main control device 31 performs intervention in the automatic deceleration control. The main control device 31 causes the state of the travel limit control to transition to the normal control state S10 and maintains this state. The main control device 31 causes the state of the vehicle speed limit control for the person to transition to the limit release state S21 and maintains this state. The main control device 31 causes the state of the vehicle speed limit control for the obstacle to transition to the limit release state S21 and maintains this state. That is, the main control device 31 forcibly causes a state to transition and maintains the state irrespective of conditions for causing the state of the automatic deceleration control to transition such as a positional relation between the forklift truck 10 and the object and the vehicle speed of the forklift truck 10.

At Step S310, the main control device 31 cancels the intervention in the automatic deceleration control. When the intervention in the automatic deceleration control is performed in a previous control, the intervention in the automatic deceleration control is stopped. When the intervention in the automatic deceleration control is not performed, the main control device 31 maintains this state. Consequently, the main control device 31 causes the state of the automatic deceleration control to transition according to conditions for causing the state of the automatic deceleration control to transition. That is, the state transitions according to state transition diagrams shown in FIG. 9, FIG. 13, and FIG. 14.

The intervention control is considered to be a control for performing the intervention in the automatic deceleration control when a limit value for prohibiting the traveling of the forklift truck 10 is set by the starting limit control or when a limit value for permitting the traveling of the forklift truck 10 is set by the starting limit control.

The following will describe an operation of the present embodiment.

In the forced operation state S4, traveling of the forklift truck 10 at the vehicle speed upper limit value VS1 or less is permitted. In the forced operation pre-release state S5, traveling of the forklift truck 10 at acceleration equal to or lower than the acceleration upper limit value AS1 is permitted. Therefore, the traveling of the forklift truck 10 is possible irrespective of whether the vehicle speed upper limit value VS1 is set in the forced operation state S4 or the acceleration upper limit value AS1 is set in the forced operation pre-release state S5. When the main control device 31 transitions to the forced operation state S4, an object is present around the forklift truck 10. When the main control device 31 transitions to the forced operation state S4, according to operation of accelerator OFF by the operator, the main control device 31 determines that the operator recognizes the presence of the object. The forced operation pre-release state S5 is a state set via the forced operation state S4. Therefore, when the main control device 31 is in the forced operation state S4 or the forced operation pre-release state S5, the operator of the forklift truck 10 may recognize the presence of the object and be performing an avoidance operation for avoiding the object.

In the forced operation state S4 and the forced operation pre-release state S5, since the traveling of the forklift truck 10 is possible, a condition for causing the state of the automatic deceleration control to transition can be satisfied. If a vehicle speed upper limit value is set by the automatic deceleration control and the speed limit is imposed with the vehicle speed upper limit value, this becomes a cause of hindering the avoidance operation. The same holds true when an acceleration upper limit value is set by the automatic deceleration control and the speed limit is imposed with the acceleration upper limit value. For example, when a state of the starting limit control is the forced operation state S4 and a state of the travel limit control is the travel limit state S12, the speed limit with the minimum vehicle speed upper limit value of 0 is imposed and the forklift truck 10 stops. It is assumed that the state of the starting limit control is the forced operation state S4, the state of the vehicle speed limit control is the limit start state S23, and the vehicle speed upper limit value by the limit start state S23 is lower than the vehicle speed upper limit value VS1. In this case, if the speed limit is imposed with the vehicle speed upper limit value by the limit start state S23, the speed limit is imposed with the vehicle speed upper limit value lower than the vehicle speed upper limit value VS1. When the state of the starting limit control is the forced operation pre-release state S5 and the state of the travel limit control is the travel limit state S12, the speed limit is imposed with the minimum vehicle speed upper limit value of 0 and the forklift truck 10 stops. It is assumed that the state of the starting limit control is the forced operation pre-release state S5, the state of the vehicle speed limit control is the limit pre-release state S24, and the acceleration upper limit value AS3 is lower than the acceleration upper limit value AS1. In this case, if the speed limit is imposed with the acceleration upper limit value by the limit pre-release state S24, the speed limit is imposed with the acceleration upper limit value AS3 lower than the acceleration upper limit value AS1. In this way, although the operator is performing the avoidance operation after recognizing the object, the vehicle speed and the acceleration of the forklift truck 10 are limited to the speed limit more than that by the starting limit control, thereby hindering the avoidance operation.

In the present embodiment, by performing the intervention control, the speed limit by the automatic deceleration control is prevented from being performed when the avoidance operation is performed. By the intervention control, when the state of the starting limit control is the forced operation state S4, the state of the travel limit control is caused to transition to the normal control state S10. The states of the vehicle speed limit control for the person and the vehicle speed limit control for the obstacle transition to the limit release state S21. The normal control state S10 and the limit release state S21 are states in which both of the vehicle speed upper limit value and the acceleration upper limit value are not set. Therefore, the main control device 31 selects the vehicle speed upper limit value VS1 of the starting limit control and imposes the speed limit to permit traveling at the vehicle speed upper limit value VS1 or less.

By the intervention control, when the state of the starting limit control is the forced operation pre-release state S5 and no object is present inside the predicted track T, the state of the travel limit control is caused to transition to the normal control state S10. The states of the vehicle speed limit control for the person and the vehicle speed limit control for the obstacle is caused to transition to the limit release state S21. Therefore, the main control device 31 selects the acceleration upper limit value AS1 of the starting limit control and imposes the speed limit to permit acceleration at the acceleration upper limit value AS1 or less.

Effects of the present embodiment will be described.

(1) When a limit value is set by the starting limit control, a limit value by the automatic deceleration control is prevented from being selected as the limit value used for the speed limit. When the limit value is set by the starting limit control, it is possible to prevent, with the limit value by the automatic deceleration control, the avoidance operation of the forklift truck 10 from being hindered. Therefore, it is possible to prevent deterioration in workability.

(2) When the state of the starting limit control is the forced operation pre-release state S5 and no object is present inside the predicted track T, the limit value by the automatic deceleration control is prevented from being selected as the limit value used for the speed limit. When the state of the main control device 31 transitions from the forced operation state S4 to the forced operation pre-release state S5, the alarm by the alarm device 58 is stopped. Consequently, the operator of the forklift truck 10 may determine that the avoidance operation is completed even when the avoidance operation is not completed. When an object is present inside the predicted track T, the main control device 31 determines that the avoidance operation is not performed and permits the speed limit by the automatic deceleration control to be performed. When no object is present inside the predicted track T, the avoidance operation is considered to continue. When the avoidance operation continues, the main control device 31 prevents the limit value by the automatic deceleration control from being selected as a limit value used for the speed limit, thereby preventing the avoidance operation from being hindered. It is possible to impose the speed limit appropriately by determining, according to whether the avoidance operation is performed, whether to permit the speed limit by the automatic deceleration control.

(3) When the state of the starting limit control changes to the starting limit state S2 or the starting prohibition state S3, the main control device 31 performs the intervention in the automatic deceleration control to prevent the speed limit with the limit value of the automatic deceleration control from being imposed. That is, the main control device 31 prevents the speed limit by the automatic deceleration control from being imposed even when a limit value for prohibiting the traveling of the forklift truck 10 is set by the starting limit control. When the state of the starting limit control is the starting limit state S2 or the starting prohibition state S3, since the vehicle speed upper limit value is 0, the speed limit by the automatic deceleration control is prevented from being imposed even when the intervention in the automatic deceleration control is not performed. However, since the starting limit control and the automatic deceleration control are intermittently performed at a predetermined control period, when the main control device 31 transitions from the starting prohibition state S3 to the forced operation state S4, the speed limit by the automatic deceleration control can be imposed. The main control device 31 prevents the speed limit by the automatic deceleration control from being performed at a stage when the state of the starting limit control changes to the starting limit state S2 or the starting prohibition state S3. Consequently, it is possible to appropriately prevent the speed limit by the automatic deceleration control from being performed in the forced operation state S4 or the forced operation pre-release state S5.

(4) When an object is present inside the predicted track T, the main control device 31 sets the vehicle speed upper limit value. Specifically, when the object is present inside the predicted track T in each of the starting limit control, the travel limit control, the vehicle speed limit control for the person, and the vehicle speed limit control for the obstacle, the vehicle speed upper limit value is set. The main control device 31 controls the forklift truck 10 not to exceed the vehicle speed upper limit value. The vehicle speed of the forklift truck 10 is set to the vehicle speed upper limit value or less even if deceleration operation by the operator of the forklift truck 10 is not performed. Therefore, operability for the operator of the forklift truck 10 is improved.

When an object is present in the automatic deceleration area AA2 and inside the predicted track T, the main control device 31 sets the vehicle speed upper limit value lower than when the object is present in the automatic deceleration area AA2 and outside the predicted track T. In the embodiment, in a case where the object is a person, the vehicle speed upper limit value is set to 0 when the person is present inside the predicted track T, whereas the vehicle speed upper limit value is set to a value larger than 0 when the person is present outside the predicted track T. In a case where the object is an obstacle, the vehicle speed upper limit value larger than 0 is set when the obstacle is present inside the predicted track T, whereas the vehicle speed upper limit value is not set when the obstacle is present outside the predicted track T.

If the vehicle speed upper limit value in the case in which the object is present inside the predicted track T is always set, it causes deterioration in workability. For example, irrespective of the predicted track T, if the main control device 31 sets the vehicle speed upper limit value to 0 when a person is present in the automatic deceleration area AA2, the forklift truck 10 stops even when the person is present in a position where the person does not hinder the traveling of the forklift truck 10. In this case, a frequency of the forklift truck 10 stopping increases, which causes deterioration in workability. Even when the object is an obstacle, it causes deterioration in workability. The forklift truck 10 is often used in an environment in which many objects are present around the forklift truck 10. Further, the forklift truck 10 is more frequently sharply turned compared with a car. A stereo camera having a wider angle than a stereo camera mounted on a car is often used in the forklift truck 10. Therefore, in the forklift truck 10, if the vehicle speed upper limit value in the case in which an object is present inside the predicted track T is always set, the deterioration in workability is significant.

In contrast, in the forklift truck 10 of the present embodiment, even when an object is present in the automatic deceleration area AA2, when no object is present inside the predicted track T, the vehicle speed higher than the vehicle speed upper limit value when the object is present inside the predicted track T is permitted. The object present inside the predicted track T is more likely to hinder the traveling of the forklift truck 10 compared with the object present outside the predicted track T. Therefore, further improvement of workability is achieved by easing the vehicle speed limit in the case in which no object is present inside the predetermined track T.

(6) When the object detected by the object detection unit 51 is an obstacle, the vehicle speed upper limit value is set higher than when the object is a person. The forklift truck 10 is often used in an environment in which many objects are present around the forklift truck 10. Therefore, when the object is the obstacle, further improvement of workability is achieved by increasing vehicle speed permitted to the forklift truck 10. In particular, improvement of workability may be achieved by not imposing the speed limit when the object is an obstacle and the obstacle is not present inside the predicted track T.

(7) The obstacle detection device 55 may determine whether the object is a person or an obstacle. When performing the automatic deceleration control, the main control device 31 sets the vehicle speed upper limit value lower when the object is the person, as compared with when the object is the obstacle. In the embodiment, whereas the vehicle speed upper limit value is set to 0 when the person is present inside the predicted track T, the vehicle speed upper limit value is set to a value larger than 0 when the obstacle is present inside the predicted track T. Similarly, when the person is present outside the predicted track T, the vehicle speed upper limit value is set lower than when the obstacle is present outside the predicted track T. The person is more likely to move compared with the obstacle and approach the forklift truck 10. Therefore, when the object is the person, the main control device 31 sets the vehicle speed upper limit value lower than when the object is the obstacle to urge the operator of the forklift truck 10 to avoid the person.

(8) When the object is the person, the main control device 31 sets the vehicle speed upper limit value to a value larger than 0 outside the predicted track T and sets the vehicle speed upper limit value to 0 in the predicted track T. When the person is present outside the predicted track T, the main control device 31 sets the vehicle speed upper limit value lower as the distance from the forklift truck 10 to the person is shorter. Since the vehicle speed of the forklift truck 10 decreases as the person approaches the forklift truck 10. Therefore, the forklift truck 10 is possible when the person enters the predicted track T and the vehicle speed upper limit value is set to 0.

(9) When the object is present in the starting limit area AA1 and inside the predicted track T, the main control device 31 sets the vehicle speed upper limit value to 0. Since the vehicle speed upper limit value is set to 0, the starting of the forklift truck 10 is prohibited. When the object is present in the starting limit area AA1 and inside the predicted track T, the traveling of the forklift truck 10 may be hindered. In this case, the starting of the forklift truck 10 is prohibited to urge the operator to change a travel direction or turn. Consequently, the traveling of the forklift truck 10 is prevented from being hindered, thereby further improving workability.

(10) The main control device 31 sets the predicted track T longer in the travel direction as the vehicle speed of the forklift truck 10 is higher. A time until the forklift truck 10 reaches the object is shorter as the vehicle speed of the forklift truck 10 is higher. Therefore, by setting the predicted track T longer as the vehicle speed of the forklift truck 10 is higher, it is possible to apply a proper vehicle speed limit corresponding to the vehicle speed of the forklift truck 10.

(11) The main control device 31 derives the predicted track T from the steering angle. When the forklift truck 10 turns, the main control device 31 derives the predicted track T according to a turning direction of the forklift truck 10. Therefore, it is possible to improve accuracy of the predicted track T to be derived.

(12) The forklift truck 10 includes the cargo handling device 20 on which a cargo is loaded. In the forklift truck 10 on which a cargo is loaded, stability is requested because the cargo is loaded. By setting the vehicle speed upper limit value, the stability of the forklift truck 10 may be improved.

(13) The forced operation state S4 is set in the starting limit control. When transitioning to the forced operation state S4, the main control device 31 permits starting of the forklift truck 10 even when an object is present in the starting limit area AA1 and inside the predicted track T. If the starting of the forklift truck 10 is always prohibited when the obstacle is present in the starting limit area AA1 and inside the predicted track T, the starting of the forklift truck 10 is prohibited even in a state where the forklift truck 10 may be started while avoiding the object. In the forced operation state S4, by setting the vehicle speed upper limit value and permitting the starting of the forklift truck 10 with the vehicle speed set low, further improvement of workability may be achieved.

(14) In the starting limit control, the alarm by the alarm device 58 is issued when an object is present inside the predicted track T and the alarm by the alarm device 58 is not issued when the object is present outside the predicted rack T. In the travel limit control, the alarm by the alarm device 58 is issued when a person is present in the alarm area and the alarm by the alarm device 58 is not issued when the person is present in a farther distance than the alarm area. In the vehicle speed limit control for the person and the vehicle speed limit control for the obstacle, the alarm by the alarm device 58 is issued when the object is present in the prior alarm area and the alarm by the alarm device 58 is not issued when the object is positioned farther than the prior alarm area. It can be said that the main control device 31 limit an area where the alarm by the alarm device 58 is issued in the object detectable range by the object detection unit 51 in this way. If the alarm by the alarm device 58 is always issued when the object is detected by the object detection unit 51, the alarm is issued even when the traveling of the forklift truck 10 is not hindered by the object. In this case, the operator may get used to the alarm and cannot recognize the object even when the traveling of the forklift truck 10 is actually hindered by the object. Limiting the alarm by the alarm device 58 may prevent the operator from getting used to the alarm.

The embodiment may be changed and implemented as described below. The embodiment and the following modifications may be implemented in combination with each other in a technically consistent range.

The main control device 31 need not necessarily perform the determination at Step S200 and Step S210. That is, when the state of the starting limit control is the starting limit state S2 or the starting prohibition state S3, the main control device 31 need not necessarily perform the intervention in the automatic deceleration control. When the state of the starting limit control is the starting limit state S2 or the starting prohibition state S3, since the forklift truck 10 is stopped, the speed limit by the automatic deceleration control is considered not to be performed. Therefore, when at least the limit value with which the traveling of the forklift truck 10 is permitted is set by the starting limit control, it only has to be able to prevent the speed limit by the automatic deceleration control from being imposed.

In the forced operation state S4, the alarm by the alarm device 58 need not necessarily be issued. In this case, when the state of the starting limit control is the forced operation state S4 and no object is present inside the predicted track T, the main control device 31 may be configured to prevent the speed limit by the automatic deceleration control from being imposed. It is considered that, when the determination result at Step S220 is affirmative, the determination at Step S240 is performed and, when the determination result at Step S240 is negative, the processing at Step S300 is performed.

The main control device 31 may be configured not to perform the processing at Step S240. In this case, when the determination result at Step S230 is affirmative, the main control device 31 performs the processing at Step S300. When the determination result at Step S230 is negative, main control device 31 performs the processing at Step S310. When the state of the travel start restriction state is the forced operation pre-release state S5, the main control device 31 is considered to perform the control such that the speed limit of the automatic deceleration control is not performed irrespective of whether the object is present inside the predicted track T.

In this case, the speed limit of the automatic deceleration control is performed only when the state of the starting limit control is the normal control state S10. Therefore, the operator of the forklift truck 10 easily understands the speed limit and improvement of operability is achieved.

The main control device 31 may prevent the speed limit by the automatic deceleration control from being imposed only when the state of the starting limit control is the forced operation state S4. The main control device 31 may prevent the speed limit by the automatic deceleration control from being imposed only when the state of the starting limit control is the forced operation pre-release state S5.

When performing the intervention in the automatic deceleration control, the main control device 31 may perform the intervention by treating an obstacle as being absent. When the obstacle is not detected by the object detection unit 51, the state of the travel limit control is the normal control state S10. When the obstacle is not detected by the object detection unit 51, the state of the vehicle speed limit control for the person and the vehicle speed limit control for the obstacle are the limit release state S21. When performing the automatic deceleration control, the main control device 31 regards that the obstacle is not detected by the object detection unit 51. Thus, the state of the travel limit control may be maintained in the normal control state S10 and the state of the vehicle speed limit control for the person and the vehicle speed limit control for the obstacle may be maintained in the limit release state S21. Therefore, the same effects as that in the embodiment may be obtained.

While the state of the starting limit control is the forced operation state S4 or the forced operation pre-release state S5, when a limit value is set by the automatic deceleration control, the main control device 31 may perform a control for prioritizing the limit value set in the starting limit control. When the state of the starting limit control is the forced operation state S4 or the forced operation pre-release state S5, the main control device 31 only has to be configured to apply the speed limit with the limit value set by the starting limit control, and the method therefor may be selected freely.

The automatic deceleration control only has to include at least one of the travel limit control, the vehicle speed limit control for the person, and the vehicle speed limit control for the obstacle.

In the starting limit control, the forced operation pre-release state S5 may be omitted. In this case, if the condition F1 is satisfied when the main control device 31 is in the forced operation state S4, the main control device 31 transitions to the normal control state S10.

In the forced operation state S4, an acceleration upper limit value may be set instead of the vehicle speed upper limit value VS1. In the forced operation state S4, the acceleration upper limit value may be set, in addition to the vehicle speed upper limit value VS1.

In the forced operation pre-release state S5, the vehicle speed upper limit value may be set instead of the acceleration upper limit value AS1. In the forced operation pre-release state S5, the vehicle speed upper limit value may be set in addition to the acceleration upper limit value AS1. The vehicle speed upper limit value set in the forced operation pre-release state S5 may be set to a value higher than the vehicle speed upper limit value set in the forced operation state S4.

The starting limit control may be a control in which the speed limit is imposed irrespective of the predicted track T when an object is present in the starting limit area AA1. A condition concerning the predicted track T only has to be deleted from the conditions for the state transition, for example, deleting the condition A2 from the starting limit condition. When the speed limit is imposed irrespective of the predicted track T, the starting limit area AA1 may not be divided into a plurality of regions. The starting limit area AA1 is not limited to the area in the travel direction of the forklift truck 10 but may be an area on a side of the forklift truck 10. In this case, the stereo camera 52 is disposed to be able to detect the object present on the side of the forklift truck 10.

The travel limit control may be modified to a control in which the speed limit is imposed irrespective of the predicted track T if a person is present in the automatic deceleration area AA2. A condition concerning the predicted track T only has to be deleted from the conditions for the state transition, for example, changing the condition J1 of the travel limit condition as follows.

Condition J1 . . . A person is present in the automatic deceleration area AA2.

The automatic deceleration area AA2 is not limited to the area in the travel direction of the forklift truck 10, but may be an area on a side of the forklift truck 10.

The vehicle speed limit control for the obstacle may be control in which the speed limit is imposed irrespective of the predicted track T if an obstacle is present in the automatic deceleration area AA2. For example, the vehicle speed limit area in the vehicle speed limit control for the obstacle only has to be an area unrelated to the predicted track T. The vehicle speed limit area may be set to a position farther away from the forklift truck 10 than the starting limit area AA1 in the automatic deceleration area AA2.

As described above, when the speed limit for the forklift truck 10 is imposed without using the predicted track T, the main control device 31 need not necessarily derive the predicted track T.

The vehicle speed upper limit value set in the forced operation state S4 may be a lower value as a lifting height of the cargo handling device 20 increases. In this case, the vehicle speed upper limit value is not limited to a mode in which the vehicle speed upper limit value decreases in proportion to an increase in the lifting height of the cargo handling device 20. When the mast 21 is raised from the lowest position to the highest position, there needs to be at least one point at which the vehicle speed upper limit value decreases and there is no point where the vehicle speed upper limit value increases. For example, a lifting height threshold is set for the lifting height and, when the lifting height is smaller than the lifting height threshold, the lifting height is determined as a low lifting height and as a high lifting height when the lifting height is equal to or larger than the lifting height threshold. When the lifting height is at the high lifting height, the main control device 31 sets the vehicle speed upper limit value lower as compared with when the lifting height is at the low lifting height.

Similarly, the vehicle speed upper limit value set in the limit start state S23 may be set to a lower value as the lifting height of the cargo handling device 20 is larger. The vehicle speed upper limit value set in the limit start state S23 is set according to the distance to the object and the lifting height and is a lower value as the distance to the object is shorter and is a lower value as the lifting height of the cargo handling device 20 is larger. It is noted that one of the vehicle speed upper limit value in the case in which a person is present outside the predicted track T and inside the automatic deceleration area AA2 and the vehicle speed upper limit value in the case in which an obstacle is present inside the predicted track T may be set to a lower value as the lifting height of the cargo handling device 20 is larger or both of the vehicle speed upper limit values may be set to a lower value as the lifting height of the cargo handling device 20 is larger. The vehicle speed upper limit value set in the limit start state S23 may be a value that does not change according to the distance to the object and changes only according to the lifting height of the cargo handling device 20.

The vehicle speed upper limit value set in the forced operation state S4 may be a lower value as the weight of a cargo loaded on the cargo handling device 20 increases. In this case, the vehicle speed upper limit value is not limited to a mode in which the vehicle speed upper limit value decreases in proportion to an increase in the weight of the cargo. When the weight of the cargo is changed from weight in the case in which the cargo is not loaded to maximum loading weight, there needs to be at least one point at which the vehicle speed upper limit value decreases and no point where the vehicle speed upper limit value increases. For example, a weight threshold is set for the weight of the cargo and, when the weight of the cargo is smaller than the weight threshold, the weight of the cargo is determined as a light weight and as a heavy weight when the weight of the cargo is equal to or larger than the weight threshold. When the weight of the cargo is at the heavy weight, the main control device 31 sets the vehicle speed upper limit value lower as compared with when the weight of the cargo is at the light weight.

Similarly, the vehicle speed upper limit value set in the limit start state S23 may be set to a lower value as the weight of the cargo increases. The vehicle speed upper limit value set in the limit start state S23 is set according to the distance to the object and the weight of the cargo and is a lower value as the distance to the object is shorter and is a lower value as the weight of the cargo is larger. It is noted that one of the vehicle speed upper limit value in the case in which a person is present outside the predicted track T and inside the automatic deceleration area AA2 and the vehicle speed upper limit value in the case in which an obstacle is present inside the predicted track T may be set to a lower value as the weight of the cargo is larger or both of the vehicle speed upper limit values may be set to a lower value as the weight of the cargo is larger. The vehicle speed upper limit value set in the limit start state S23 may be a value that does not change according to the distance to the object and changes only according to the weight of the cargo.

At least one of the vehicle speed upper limit value set in the forced operation state S4 and the vehicle speed upper limit value set in the limit start state S23 may be set to a lower value as the lifting height of the cargo handling device 20 is larger and set to a lower value as the weight of the cargo is larger. That is, the two modifications described about the vehicle speed upper limit value may be combined.

The acceleration upper limit value set in at least one of the forced operation pre-release state S5, the limit pre-release state S24 at the time when a person is present outside the predicted track T, and the limit pre-release state S24 at the time when an obstacle is present outside the predicted track T may be set to a lower value as the lifting height of the cargo handling device 20 is larger. In this case, the forklift truck 10 more gently accelerates as the lifting height of the cargo handling device 20 is larger.

The acceleration upper limit value set in at least one of the forced operation pre-release state S5, the limit pre-release state S24 at the time when a person is present outside the predicted track T, and the limit pre-release state S24 at the time when an obstacle is present outside the predicted track T may be set to a lower value as the weight of the cargo is larger. In this case, the forklift truck 10 more gently accelerates as the weight of the cargo is larger.

The acceleration upper limit value set in at least one of the forced operation pre-release state S5, the limit pre-release state S24 at the time when a person is present outside the predicted track T, and the limit pre-release state S24 at the time when an obstacle is present outside the predicted track T may be set to a lower value as the lifting height of the cargo handling device 20 is greater and set to a lower value as the weight of the cargo is larger. That is, the two modifications described about the acceleration upper limit value may be combined.

The deceleration upper limit value set in at least one of the travel limit state S12, the limit start state S23 at the time when a person is present outside the predicted track T, and the limit start state S23 at the time when an obstacle is present inside the predicted track T may be set to a lower value as the lifting height of the cargo handling device 20 is larger. In this case, the forklift truck 10 more gently decelerate as the lifting height of the cargo handling device 20 is greater.

The deceleration upper limit value set in at least one of the travel limit state S12, the limit start state S23 at the time when a person is present outside the predicted track T, and the limit start state S23 at the time when an obstacle is present inside the predicted track T may be set to a lower value as the weight of the cargo is larger. In this case, the forklift truck 10 more gently accelerates as the weight of the cargo is greater.

The deceleration upper limit value set in at least one of the travel limit state S12, the limit start state S23 at the time when a person is present outside the predicted track T, and the limit start state S23 at the time when an obstacle is present inside the predicted track T may be set to a lower value as the lifting height of the cargo handling device 20 is greater and set to a lower value as the weight of the cargo is greater. That is, the two modifications described about the deceleration upper limit value may be combined.

When all of the vehicle speed upper limit value, the acceleration upper limit value, and the deceleration upper limit value are not changed according to the lifting height of the cargo handling device 20, the forklift truck 10 may not include the lifting height sensor 37.

When all of the vehicle speed upper limit value, the acceleration upper limit value, and the deceleration upper limit value are not changed according to the weight of the cargo, the forklift truck 10 may not include the weight sensor 38.

The vehicle speed upper limit value set in the limit start state S23 need not necessarily be changed according to the distance to the object. That is, the vehicle speed upper limit value set in the limit start state S23 may be a fixed value. In this case, the vehicle speed upper limit value in the case in which a person is present outside the predicted track T and inside the automatic deceleration area AA2 is preferably set to a lower value than the vehicle speed upper limit value in the case in which an obstacle is present inside the predicted track T.

The main control device 31 may not set the length of the predicted track T with respect to the travel direction larger as the vehicle speed of the forklift truck 10 is higher. In this case, the length of the predicted track T with respect to the travel direction is set to a predetermined fixed length.

The main control device 31 need not necessarily change the predicted track T according to the steering angle of the steering wheels 14. That is, the predicted track T may be the predicted track T when the forklift truck 10 is traveling straight in the backward travel direction irrespective of whether the forklift truck 10 is turning.

The main control device 31 may set, as the predicted track T, in addition to a region between the track LT on which the left end LE of the vehicle body 11 passes and the track RT on which the right end RE of the vehicle body 11 passes, a region located further on the outer side than this region and extending along the track LT and the track RT. That is, the predicted track T may be a track obtained by adding a margin extending in the vehicle width direction of the forklift truck 10 to a region where the forklift truck 10 is predicted to pass.

When deriving the predicted track T of the forklift truck 10, the main control device 31 may derive the predicted track T based on the steering angle. For example, a threshold with which a turn to the right may be determined and a threshold with which a turn to the left may be determined are set for the steering angle so as to determine from the steering angle whether the forklift truck 10 travels straight, turns to the right, or turns to the left. When performing the starting limit control, the main control device 31 determines which of the regions N, NL, and NR the forklift truck 10 passes from the steering angle. In this case, the regions N, NL, and NR may be regarded as a predicted track.

The main control device 31 may derive the predicted track T from a map in which the vehicle speed and the steering angle of the forklift truck 10 and an X coordinate and a Y coordinate are associated.

The main control device 31 may not perform different controls according to whether the object is a person or an obstacle. Specifically, when performing the automatic deceleration control, the main control device 31 may stop the traveling of the forklift truck 10 when the object is present inside the predicted track T and may not apply the vehicle speed limit when no object is present inside the predicted track T. When performing the automatic deceleration control, the main control device 31 may set the vehicle speed upper limit value lower when the object is present inside the predicted track T compared with when the object is present outside the predicted track T. In this case, the obstacle detection device 55 may not perform the determination of whether the object is the person.

The travel limit control only has to be able to change the state of the main control device 31 to at least the two states of the normal control state S10 and the travel limit state S12. In this case, the main control device 31 transitions to the travel limit state S12 upon the satisfaction of the travel limit condition and transitions to the normal control state S10 upon the satisfaction of the travel limit release condition. That is, the main control device 31 only has to be able to set the vehicle speed upper limit value to 0 when a person is present inside the predicted track T.

The vehicle speed limit control only has to be able to change the state of the main control device 31 to at least the two states of the limit release state S21 and the limit start state S23. In this case, the main control device 31 transitions to the limit start state S23 upon the satisfaction of the first limit start condition and transitions to the limit release state S21 upon the satisfaction of the limit start release condition. That is, when an object is present in the vehicle speed limit area, the main control device 31 only has to be able to set the vehicle speed upper limit value.

The automatic deceleration area AA2 may be an area narrower than the object detectable range by the object detection unit 51.

The acceleration upper limit value and the deceleration upper limit value may be set to states in which limits are not imposed for the acceleration upper limit value and the deceleration upper limit value.

In the state transition in the starting limit control, the conditions may be changed as follows.

The satisfaction of the starting limit condition may be modified to all of the following conditions A11, A12, and A13 being satisfied.

Condition A11 . . . An object is present in the starting limit area AA1 and inside the predicted track T.

Condition A12 . . . The forklift truck 10 is stopped.

Condition A13 . . . The detection result of the direction sensor 35 is not the forward travel.

Whether the condition A11 is satisfied may be determined from an X coordinate and a Y coordinate of the object. Since the starting limit area AA1 and the predicted track T are specified by X coordinates and Y coordinates, whether the object is present in the starting limit area AA1 and inside the predicted track T may be determined from the X coordinate and the Y coordinate of the object. The condition A12 is the same condition as the condition A3. The condition A13 indicates that the detection result of the direction sensor 35 is the backward travel or the neutral.

The starting limit release condition may be modified to at least one of the following conditions B11 and B12 being satisfied.

Condition B11 . . . No object is present in the starting limit area AA1 and inside the predicted track T.

Condition B12 . . . The detection result of the direction sensor 35 is the forward travel.

The condition B11 is also considered to be that the condition A11 is not satisfied. The condition B12 is also considered to be that the condition A13 is not satisfied.

When the starting limit condition and the starting limit release condition are set as described above, the starting limit area AA1 may not be divided into the plurality of regions N, NL, and NR.

The satisfaction of the forced operation pre-release condition may be modified to the condition B11 being satisfied.

The satisfaction of the forced operation regular release condition may be modified any one of the conditions G1 and G2 of the embodiment and the following condition G11 being satisfied.

Condition G11 . . . The detection result of the direction sensor 35 is the forward travel.

By adding the condition G11 to the forced operation regular release condition, if the operator changes the travel direction to the forward travel direction during the forced operation pre-release state S5, the main control device 31 transitions to the normal control state S10. The operator may intentionally cause the main control device 31 to transition to the normal control state S10 by changing the travel direction to the forward travel direction.

The satisfaction of the forced operation regular release condition may be modified to any one of the conditions G1, G2 and G11 and the following condition G12 being satisfied.

Condition G12 . . . Both of the following condition G21 and condition G22 are satisfied.

Condition G21 . . . The detection result of the direction sensor 35 is the backward travel and a state in which the region N, NL, or NR where an object is present, and the direction of the predicted track T do not coincide continues for a specified time.

Condition G22 . . . The forklift truck 10 is traveling.

When the condition G21 is satisfied, the operator of the forklift truck 10 is considered to have changed, with steering wheel operation, the turning direction to a direction in which no object is present. That is, the operator of the forklift truck 10 is considered to recognize the presence of the object with any one of the vehicle speed limit, the acceleration limit, and the alarm, and to be performing an avoidance operation for avoiding the object. As the specified time in the condition G21, any value may be set. The specified time is set to a time in which it is possible to determine that the operator of the forklift truck 10 is performing the avoidance operation. Even when the turning direction is changed by the steering wheel operation to the direction in which no object is present, when the turning direction is returned to a direction in which the object is present, before the specified time elapsed, it is regarded that the avoidance operation is not being performed. The specified time may be optionally set, for example, one second to three seconds.

The condition G22 is the same condition as the condition E3. When the vehicle speed is higher than the stop determination threshold [km/h], the main control device 31 determines that the forklift truck 10 is traveling.

By setting the condition G21 as one of conditions for satisfying the condition G12 as, it is possible to cause the forced operation pre-release state S5 to transition to the normal control state S10 when the operator is performing the avoidance operation. When the main control device 31 is in the forced operation pre-release state S5, in some cases, the operator recognizes the object hindering the traveling of the forklift truck 10 and is performing an avoidance operation for avoiding the object. At this time, if the acceleration limit is imposed, the acceleration of the forklift 10 is restricted, which may prevent the forklift 10 from traveling smoothly and reduce workability. When the condition G12 is satisfied, the acceleration limit may be released by causing the main control device 31 to transition to the normal control state S10. This prevents the acceleration limit from being imposed during the avoidance operation or after the avoidance operation while the forklift truck 10 is travelling, which may suppress deterioration in workability.

By setting the condition G22 as one of conditions for satisfying the condition G12, it is possible to prevent the main control device 31 from immediately transitioning to the starting limit state S2 after the transition to the normal control state S10 by the satisfaction of the condition G12. If only the condition G21 is set as a condition for satisfying the condition G12, the condition G12 can be satisfied even in a state in which the forklift truck 10 is stopped. In this case, the main control device 31 may immediately transition to the starting limit state S2 after the transition to the normal control state S10 by the satisfaction of the condition G12. For example, when the turning direction is changed to the direction in which no object is present, and then the turning direction is returned to the direction in which the object is present while the forklift truck 10 is stopped, the main control device 31 may transition to the starting limit state S2. In this case, even if the operator is about to perform an avoidance operation, the avoidance operation may be hindered by the transition to the starting limit state S2. By setting the condition G22 as one of conditions for satisfying the condition G12, the condition G12 is satisfied when the forklift truck 10 is traveling. When the main control device 31 transitions to the normal control state S10 upon the satisfaction of the condition G12, the satisfaction of the condition A3 is suppressed, and the starting limit condition is less easily satisfied. This may prevent the avoidance operation from being hindered.

The satisfaction of the forced operation regular release condition may be modified to any one of the conditions G1, G2, G11, and G21 being satisfied. Even in this case, when the operator is performing an avoidance operation, it is possible to transition the forced operation pre-release state S5 to the normal control state S10 according to the condition G21. Therefore, the deterioration in workability may be suppressed. Even if the condition G22 is not satisfied, it is possible to cause the main control device 31 to immediately transition to the starting limit state S2 after the transition to the normal control state S10 by causing the main control device 31 to transition to the normal control state S10 upon the satisfaction of the condition G21. The condition A1 and the condition A2 may be satisfied when the main control device 31 transitions from the forced operation pre-release state S5 to the normal control state S10, for example, when an object approaches the forklift truck 10. At this time, if the forced operation regular release condition is satisfied upon the satisfaction of both of the condition G21 and the condition G22, the satisfaction of the condition A3 is suppressed and a travel start restriction for an object newly detected may not function. In contrast, even if the condition G22 is not satisfied, when the main control device 31 is caused to transition to the normal control state S10 upon the satisfaction of the condition G21, which allows the travel start restriction to function for the object newly detected.

The satisfaction of the forced operation regular release condition may be modified to any one of the conditions G1, G2, and G12 and the following condition G13 being satisfied.

Condition G13 . . . Both of the condition G22 and the following condition G23 are satisfied.

Condition G23 . . . A state in which the detection result of the direction sensor 35 is the forward travel continues for a specified time.

The specified time in the condition G23 is the same time as the specified time in the condition G21. By setting the satisfaction of the forced operation regular release condition when one of the condition G12 and the condition G13 is satisfied, it is possible to cause the main control device 31 to transition to the normal control state S10 with the same operation irrespective of whether the travel direction of the forklift truck 10 is the forward travel direction or the backward travel direction. Specifically, the main control device 31 transitions to the normal control state S10 when an avoidance operation in the forward travel direction is continuously performed for the specified time or an avoidance operation in the backward travel direction is continuously performed for the specified time. The operator only has to perform the same operation in order to cause the main control device 31 to transition to the normal control state S10 whether the travel direction of the forklift truck 10 is the forward travel direction or the backward travel direction. Thus, the operability may be improved.

The satisfaction of the forced operation regular release condition may be modified to any one of the conditions G1, G2, G21, and G23 being satisfied. In this case, even if the condition G22 is not satisfied, it is possible to cause the main control device 31 to transition to the normal control state S10 upon the satisfaction of one of the condition G21 and the condition G23. This allows the travel start restriction to function for the object newly detected easily. The operator only has to perform the same operation in order to cause the main control device 31 to transition to the normal control state S10 irrespective of whether the travel direction of the forklift truck 10 is the forward travel direction or the backward travel direction. Thus, the operability may be improved.

The satisfaction of the forced operation regular release condition may be modified to any one of the conditions G1, G2, and G12 being satisfied or may be modified to any one of the conditions G1, G2, and G21 being satisfied.

The satisfaction of the forced operation regular release condition may be modified to any one of the conditions G1, G2, G11, G12, and G13 being satisfied. In this case, when the condition G13 is satisfied, the condition G11 is satisfied and the condition G13 does not practically function. Therefore, it is possible to obtain the same effects as the effects obtained when the satisfaction of the forced operation regular release condition is the satisfaction of any one of the conditions G1, G2, G11, and G12.

The forced operation condition may be any condition as long as it can determine that the operator has recognized that an object is present in the starting limit area AA1. For example, the forced operation condition may be steering wheel operation by the operator. Whether the steering wheel is operated may be determined from a detection result of a steering wheel angle sensor for detecting an angle of the steering wheel or the tire angle sensor 36. The forced operation release condition may be, for example, button operation by the operator, a voice input by an input unit, or operation of a touch panel provided in the forklift truck 10.

In the starting limit state S2, the alarm to the operator by the alarm device 58 need not necessarily be issued.

In the starting prohibition state S3, the alarm by the alarm device 58 need not necessarily be intensified and the same alarm as the alarm in the starting limit state S2 may be issued. In the starting prohibition state S3, the alarm by the alarm device 58 need not necessarily be issued.

In the forced operation state S4, the alarm by the alarm device 58 need not necessarily be set weaker than the alarm in the starting prohibition state S3 and the same alarm as the alarm in the starting prohibition state S3 may be issued.

In the travel limit control, the pre-travel limit state S11 may be omitted. In this case, the alarm area may not be set.

The alarm in the pre-travel limit state S11 and the pre-limit start state S22 may be issued at the switchback time of the forklift truck 10 as well.

In the travel limit state S12, the alarm by the alarm device 58 need not necessarily be issued.

The pre-limit start state S22 may be omitted in at least one of the vehicle speed limit control for the person and the vehicle speed limit control for the obstacle. In this case, the prior alarm area may not be set.

The alarm by the alarm device 58 may not be issued in the states of all of the starting limit control, the travel limit control, the vehicle speed limit control for the person, and the vehicle speed limit control for the obstacle. In this case, the forklift truck 10 may not be provided with the alarm device 58.

The starting limit area AA1 may be divided into four or more regions.

The dimension of the center region N in the left-right direction may be slightly greater than or smaller than the dimension in the vehicle width direction of the forklift truck 10.

As the steering angle of the steering wheels 14, a detection result of the steering wheel angle sensor may be used. The steering wheel angle sensor detects an angle of the steering wheel and outputs a detection result to the main control device 31. Since the steering angle is controlled according to the detection result of the steering wheel angle sensor, the steering angle may be detected from the detection result of the steering angle sensor.

The object detection unit 51 only has to be able to detect an object present around the forklift truck 10. For example, the object detection unit 51 may detect the position of the object present in the forward travel direction in the travel direction of the forklift truck 10. In this case, the stereo camera 52 is disposed to face forward of the forklift truck 10. When the position of the object present in the forward travel direction of the forklift truck 10 is detected by the object detection unit 51, the automatic deceleration area AA2 and the starting limit area AA1 are areas expanding in the front from the forklift truck 10. When the forklift truck 10 is traveling forward, the starting limit control, the travel limit control, the vehicle speed limit control for the person, and the vehicle speed limit control for the obstacle function. Specifically, by reversing "backward" and "forward" described in the embodiment in the starting limit control, the travel limit control, the vehicle speed limit control for the person, and the vehicle speed limit control for the obstacle, the vehicle speed limit may be imposed according to the position of the object when the forklift truck 10 is traveling forward. When the position of the object present in the forward travel direction in the travel direction of the forklift truck 10 is detected by the object detection unit 51, the main control device 31 derives the predicted track T extending in the forward travel direction.

The object detection unit 51 may be an object detection unit that may detect the positions of objects present in both of the backward travel direction and the forward travel direction in the travel direction of the forklift truck 10. In this case, the objects present in both of the backward travel direction and the forward travel direction in the travel direction of the forklift truck 10 may be detectable by one object detection unit 51. The object detection unit 51 for the forward travel direction and the object detection unit 51 for the backward travel direction may be provided. In a case where the positions of the objects present in both of the backward travel direction and the forward travel direction in the travel direction of the forklift truck 10 are detected, when the forklift truck 10 is traveling forward, the vehicle speed limit is imposed by the object present in the forward travel direction. When the forklift truck 10 is traveling backward, the vehicle speed limit is imposed by the object present in the backward travel direction. That is, it can be said that the main control device 31 is configured to set the vehicle speed upper limit value when the travel direction of the forklift truck 10 is a direction in which the forklift truck 10 approaches the object detected by the object detection unit 51.

In a case where the vehicle speed limit is imposed irrespective of whether the travel direction of the forklift truck 10 is the forward travel direction or the backward travel direction, the satisfaction of the forced operation regular release condition is preferably any one of the conditions G1, G2, G12, and G13 being satisfied. In this case, the condition G23 may be changed as follows.

Condition G23 . . . The detection result of the direction sensor 35 is the forward travel and a state in which a region where the object is present, and a direction of a predicted track do not coincide continues for a specified time.

The main control device 31 is configured to determine whether the state in which a predicted track extending to the front of the forklift truck 10 and a region where the object is present frontward of the forklift truck 10 do not coincide continues for a specified time.

The object detection unit 51 may use a ToF: Time of Flight camera, a LIDAR: Laser Imaging Detection and Ranging, a millimeter wave radar, or the like, instead of the stereo camera 52. The ToF camera is a ToF camera including a camera and a light source that irradiates light, the ToF camera deriving a distance in a depth direction for each of pixels of an image captured by the camera, from a time until reflected light of the light irradiated from the light source is received. The LIDAR is a distance meter capable of recognizing a peripheral environment by, while changing an irradiation angle, irradiating a laser and receiving reflected light reflected from a portion where the laser is irradiated. The millimeter wave radar is capable of recognizing a peripheral environment by irradiating a radio wave in a predetermined frequency band to the periphery. The stereo camera 52, the ToF camera, the LIDAR, and the millimeter wave radar are sensors that may measure a three-dimensional coordinate in the world coordinate system. The object detection unit 51 preferably includes a sensor that may measure the three-dimensional coordinate. When the object detection unit 51 includes the sensor that may measure the three-dimensional coordinate, the obstacle detection device 55 may determine, by using a person determiner that has subjected to machine learning in advance, whether the object is a person or an obstacle. It is noted that the object detection unit 51 may include a combination of a plurality of sensors such as the stereo camera 52 and the LIDAR.

The object detection unit 51 may include, instead of the stereo camera 52, a sensor that may measure a coordinate of an object on an XY plane that is a coordinate plane representing a horizontal plane. That is, a sensor that may measure a two-dimensional coordinate of an object may be used as the sensor. As an example of this type of the sensor, a two-dimensional LIDAR that performs irradiation of a laser while changing an irradiation angle in the horizontal direction may be used.

The stereo camera 52 may include three or more cameras.

The obstacle detection device 55 may determine whether the object is a person or an obstacle using a comparative image among images captured by the stereo camera 52. Since a coordinate of an object is derived from a reference image, if a coordinate of the object on the comparative image is derived from the coordinate of the object, deviation corresponding to a base line length occurs. Therefore, the obstacle detection device 55 corrects the coordinate of the object on the comparative image according to the base line length and performs person detection processing on the corrected coordinate.

A unit other than the object detection unit 51 may include the alarm device 58.

The main control device 31 may directly actuate the alarm device 58.

The forklift truck 10 may travel according to driving of an engine as a driving device. In this case, the travel control device 43 is a device that controls, for example, a fuel injection amount to the engine.

The forklift truck 10 may be a four-wheel forklift truck 10. In this case, the main control device 31 derives the predicted track T from a formula or a map for deriving the predicted track T of the four-wheel forklift truck 10. That is, the formula or the map for deriving the predicted track T is changed according to a type of an industrial vehicle.

The forklift truck 10 may be a forklift truck that may switch automatic operation and manual operation.

The forklift truck 10 may be a forklift truck that is remotely operated by an operator who is not on the forklift truck 10.

The forklift truck 10 may be a forklift truck that rotates the two driving wheels 12 and 13 with one travel motor.

A device that performs the starting limit control and a device that performs the automatic deceleration control may be separately provided. In this case, the device that performs the starting limit control is the first control unit and the device that performs the automatic deceleration control is the second control unit. The predicted track derivation unit may be provided separately from the device that performs the starting limit control and the automatic deceleration control.

The main control device 31, the travel control device 43, and the object detection unit 51 may be configured to be capable of acquiring information concerning the main control device 31, the travel control device 43, and the object detection unit 51 through a radio.

The industrial vehicle may be any industrial vehicle used for work in a limited region such as a tractor used for conveyance of a cargo and the like and an order picker used for picking work. That is, the industrial vehicle may be an industrial vehicle not including the cargo handling device 20 that performs unloading and loading.

REFERENCE SINGS LIST

10 . . . Forklift truck functioning as industrial vehicle
31 . . . Main control device functioning as first control unit, second control unit, speed limit unit, starting prohibition control unit, starting permission control unit, first permission control unit, second permission control unit, and predicted track derivation unit

41 . . . Travel motor functioning as driving device
43 . . . Travel control device
51 . . . Object detection unit

The invention claimed is:

1. An industrial vehicle comprising:
a driving device;
an accelerator pedal and an accelerator sensor configured to detect an accelerator opening degree of the accelerator pedal; and
a travel control device configured to control the driving device,
the industrial vehicle including:
an object detection unit configured to detect a position of an object present around the industrial vehicle;
a first control unit configured to set a limit value, when a vehicle speed of the industrial vehicle is in a first vehicle speed range, for imposing a speed limit including at least one of a vehicle speed limit and an acceleration limit of the industrial vehicle;
a second control unit configured to set the limit value when the vehicle speed of the industrial vehicle is in a second vehicle speed range; and
a speed limit unit configured to impose the speed limit according to the limit value selected from the limit value set by the first control unit and the limit value set by the second control unit, wherein
a lower limit value of the second vehicle speed range is higher than a lower limit value of the first vehicle speed range,
the first control unit includes:
a starting prohibition control unit that sets, in a starting prohibition state, the limit value such that traveling of the industrial vehicle is prohibited when the object is detected by the object detection unit, and
a starting permission control unit that sets, in a forced operation state, the limit value such that the traveling of the industrial vehicle is permitted when it is determined that an operator of the industrial vehicle recognizes a presence of the object based upon detecting that the operator has released the accelerator pedal after a transition into the starting prohibition state, and
the speed limit unit imposes the speed limit according to the limit value set by the first control unit when the limit value is set by the starting permission control unit.

2. The industrial vehicle according to claim 1, further comprising:
an alarm device; and
a predicted track derivation unit configured to derive a predicted track on which the industrial vehicle is predicted to pass, wherein
the starting permission control unit includes:
a first permission control unit that sets the limit value and causes the alarm device to issue an alarm, and
a second permission control unit that sets the limit value and does not cause the alarm device to issue the alarm, and
the speed limit unit imposes the speed limit according to the limit value set by the first control unit when the limit value is set by the second permission control unit and the object is not present the predicted track derived by in the predicted track derivation unit.

3. The industrial vehicle according to claim 1, wherein, the speed limit unit imposes the speed limit according to the limit value set by the first control unit when the limit value is set by the starting prohibition control unit or when the limit value is set by the starting permission control unit.

4. An industrial vehicle comprising:

a driving device;

an accelerator pedal and an accelerator sensor configured to detect an accelerator opening degree of the accelerator pedal; and a travel control device configured to control the driving device;

an object detection unit configured to detect a position of an object present around the industrial vehicle;

at least one memory configured to store computer program code; and at least one processor configured to access the at least one memory and operate as instructed by the computer program code, the computer program code including:

a first control code configured to set a limit value, when a vehicle speed of the industrial vehicle is in a first vehicle speed range, for imposing a speed limit including at least one of a vehicle speed limit and an acceleration limit of the industrial vehicle;

a second control code configured to set the limit value when the vehicle speed of the industrial vehicle is in a second vehicle speed range; and a speed limit code configured to impose the speed limit according to the limit value selected from the limit value set by the first control code and the limit value set by the second control code, wherein a lower limit value of the second vehicle speed range is higher than a lower limit value of the first vehicle speed range, the first control code includes:

a starting prohibition control code configured to set, in a starting prohibition state, the limit value such that traveling of the industrial vehicle is prohibited when the object is detected by the object detection code, and a starting permission control code configured to set, in a forced operation state, the limit value such that the traveling of the industrial vehicle is permitted when the at least one processor determines that an operator of the industrial vehicle recognizes a presence of the object based upon detecting that the operator has released the accelerator pedal after a transition into the starting prohibition state, and the speed limit code configured to impose the speed limit according to the limit value set by the first control code when the limit value is set by the starting permission control code.

* * * * *